(12) United States Patent
Li et al.

(10) Patent No.: US 12,164,488 B2
(45) Date of Patent: Dec. 10, 2024

(54) METHOD AND APPARATUS FOR DETERMINING CONFIGURATION KNOB OF DATABASE

(71) Applicants: Huawei Technologies Co., Ltd., Shenzhen (CN); TSINGHUA UNIVERSITY, Beijing (CN)

(72) Inventors: Guoliang Li, Beijing (CN); Shifu Li, Beijing (CN); Xuanhe Zhou, Beijing (CN); Bo Gao, Beijing (CN)

(73) Assignees: Huawei Technologies Co., Ltd., Shenzhen (CN); TSINGHUA UNIVERSITY, Beijing (CN)

( * ) Notice: Subject to any disclaimer, the term of this patent is extended or adjusted under 35 U.S.C. 154(b) by 164 days.

(21) Appl. No.: 17/525,435

(22) Filed: Nov. 12, 2021

(65) Prior Publication Data

US 2022/0067008 A1    Mar. 3, 2022

Related U.S. Application Data

(63) Continuation of application No. PCT/CN2020/073429, filed on Jan. 21, 2020.

(30) Foreign Application Priority Data

May 14, 2019    (CN) .......................... 201910401715.0

(51) Int. Cl.
*G06F 16/21*      (2019.01)
*G06F 16/2453*    (2019.01)
(Continued)

(52) U.S. Cl.
CPC ...... *G06F 16/217* (2019.01); *G06F 16/24545* (2019.01); *G06F 18/23* (2023.01); *G06N 3/048* (2023.01)

(58) Field of Classification Search
CPC ..... G06F 16/217; G06F 16/2454; G06F 16/24
(Continued)

(56) References Cited

U.S. PATENT DOCUMENTS

| | | | |
|---|---|---|---|
| 2010/0082599 A1 | 4/2010 | Graefe et al. | |
| 2012/0143847 A1* | 6/2012 | Seo | G06F 16/24561 707/718 |
| 2018/0314735 A1* | 11/2018 | Liu | G06N 20/00 |

FOREIGN PATENT DOCUMENTS

| | | |
|---|---|---|
| CA | 108234177 A | 6/2018 |
| CN | 105224599 A | 1/2016 |

(Continued)

OTHER PUBLICATIONS

Zhang et al., "A Demonstration of the OtterTune Automatic Database Management System Tuning Service," Proceedings of the VLDB Endowment, vol. 11, No. 12, pp. 1910-1913 (2018).
Van Aken et al., "Automatic Database Management System Tuning Through Large-scale Machine Learning," SIGMOD'17: Proceedings of the 2017 ACM International Conference Management of Data, Total 16 pages, XP055479043, Chicago, IL, USA (May 14-19, 2017).

(Continued)

*Primary Examiner* — Hosain T Alam
*Assistant Examiner* — Tracy M McGhee
(74) *Attorney, Agent, or Firm* — Leydig, Voit & Mayer, Ltd.

(57) ABSTRACT

A method for determining a configuration knob of a database is disclosed, and may be applied to a database management system. In this method, vectorization coding is performed on a query statement, to obtain a target feature vector of the query statement, and then a configuration knob set for determining the database is determined based on two aspects of double-state information: the target feature vector and current status information of the database (101). The configuration knob set is used to execute N query statements. The configuration knob of the database (101) may be dynamically determined based on the query statement and the current status information of the database (101), so that good performance of the database (101) in a case of different (Continued)

workload requirements, for example, performance in aspects of a delay and a throughput, can be ensured.

20 Claims, 14 Drawing Sheets

(51) Int. Cl.
*G06F 18/23* (2023.01)
*G06N 3/048* (2023.01)

(58) Field of Classification Search
USPC .......................................................... 707/802
See application file for complete search history.

(56) References Cited

FOREIGN PATENT DOCUMENTS

| | | |
|---|---|---|
| CN | 108509628 A | 9/2018 |
| CN | 108763398 A | 11/2018 |
| EP | 3447660 A1 | 2/2019 |

OTHER PUBLICATIONS

Gupta et al., "PQR: Predicting Query Execution Times for Autonomous Workload Management," 2008 International Conference on Autonomic Computing, XP031276791, pp. 13-22, Institute of Electrical and Electronics Engineers, New York, New York (Jun. 2-6, 2008).

\* cited by examiner

TO FIG. 11B

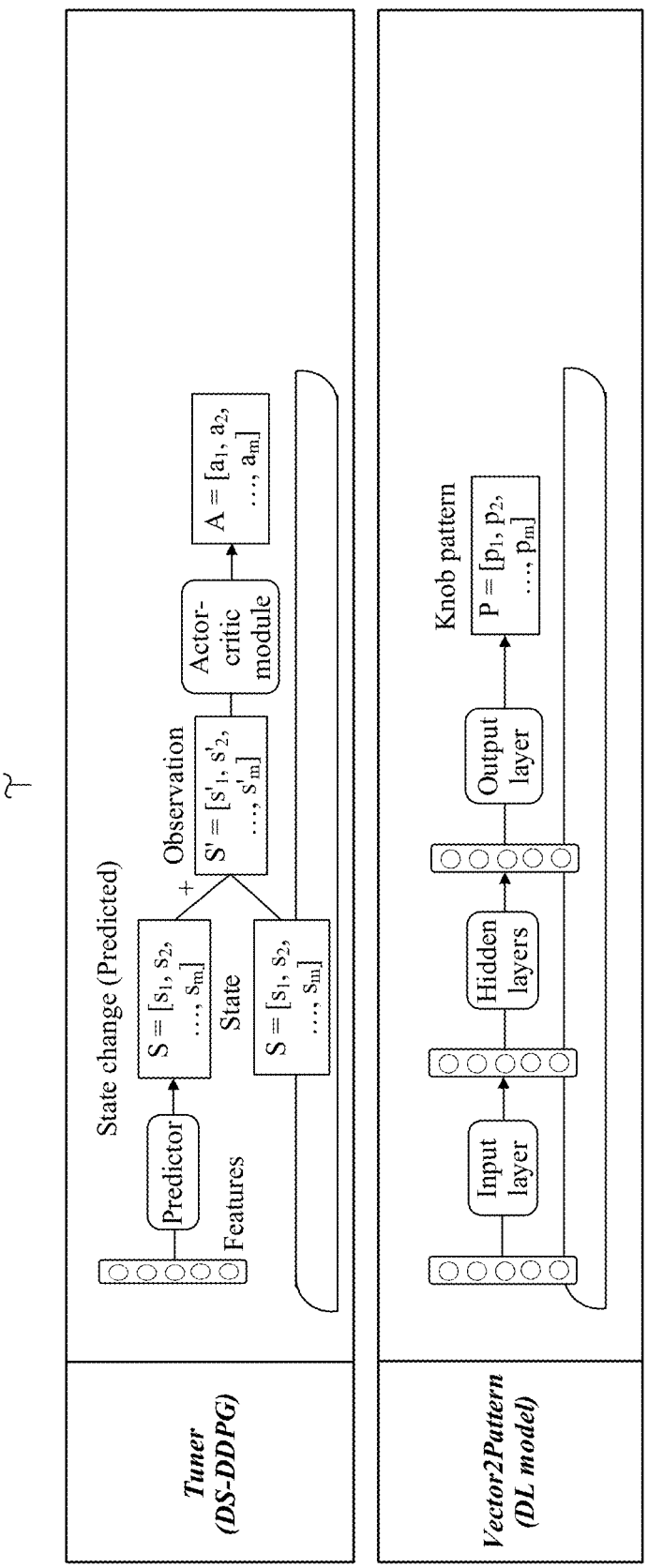

METHOD AND APPARATUS FOR DETERMINING CONFIGURATION KNOB OF DATABASE

CROSS-REFERENCE TO RELATED APPLICATIONS

This application is a continuation of International Application No. PCT/CN2020/073429, filed on Jan. 21, 2020, which claims priority to Chinese Patent Application No. 201910401715.0, filed on May 14, 2019. The disclosures of the aforementioned applications are hereby incorporated by reference in their entireties.

TECHNICAL FIELD

This application relates to the field of database technologies, and specifically, to a method and an apparatus for determining a configuration knob of a database.

BACKGROUND

A database (DB) stores massive data and can provide a data service for a large quantity of clients. In other words, the client is a workload of the database. During working, the database may run based on different configuration knobs and provide the client with data services with different performance. To be specific, if a configuration knob of the database matches a service of the workload, the database responds quickly when providing the service; or if a configuration knob of the database does not match a service of the workload, the database responds slowly when providing the service.

To better provide a service for the client, during running of the database, a database administrator (DBA) determines the configuration knob of the database based on a workload status.

Currently, the DBA needs to test a to-be-deployed service in a test environment to determine the configuration knob of the database. A large amount of time needs to be taken to determine a configuration knob that is of the database and that is applicable to the service. Once the service changes, the DBA needs to perform a test again. For a service and a quantity of workloads that may change at any time in a network, a manner in which the DBA tunes a knob cannot meet a current requirement.

SUMMARY

Embodiments of this application provide a method for determining a configuration knob of a database, to dynamically determine the configuration knob of the database based on a workload status and current status information of the database, so as to ensure good performance of the database in a case of different workload requirements, for example, performance in aspects of a delay and a throughput.

To achieve the foregoing objective, the following technical solutions are used in the embodiments of this application.

According to a first aspect, a method for determining a configuration knob of a database is provided, and may include: obtaining N query statements sent by M clients, where M is an integer greater than 0, N is an integer greater than 0, and N≥M; determining N pieces of query information from the N query statements, where the N query statements are in a one-to-one correspondence with the N pieces of query information; performing vectorization coding on the N pieces of query information, to obtain corresponding N target feature vectors, where the N pieces of query information are in a one-to-one correspondence with the N target feature vectors; and determining, based on the N target feature vectors and current status information of the database, a configuration knob set that is of the database and that corresponds to the N query statements, where the configuration knob set includes at least one target configuration knob group, the target configuration knob group includes at least one configuration knob, and the configuration knob set is used to execute the N query statements.

In the technical solution provided in the first aspect, after the configuration knob set is determined, a configuration knob currently used for the database may be tuned based on the configuration knob set, and a configuration knob tuning manner may be replacing the configuration knob currently used for the database with a configuration knob in a current configuration knob set. Alternatively, the configuration knob currently used for the database may be tuned by adding an offset value to or reducing an offset value from a value of the configuration knob currently used for the database. In the first aspect, the configuration knob of the database may be dynamically determined based on a workload status and the current status information of the database, so that good performance of the database in a case of different workload requirements can be ensured. For example, performance in aspects of a delay and a throughput can be met.

In a possible implementation of the first aspect, the method may further include: determining, in response to a mode selection instruction from a query-level knob tuning mode, a workload-level knob tuning mode, and a cluster-level knob tuning mode, a target knob tuning mode used for the N query statements. In other words, in this possible implementation, knob tuning modes at three granularities are provided: the query-level knob tuning mode, the workload-level knob tuning mode, and the cluster-level knob tuning mode. The mode selection instruction may be triggered by a user or may be triggered by a database administrator. In other words, the user or the database administrator may switch the knob tuning mode in different requirement scenarios, to meet a plurality of knob tuning requirements.

In a possible implementation of the first aspect, when the target knob tuning mode is the query-level knob tuning mode, M=1, and N=1. To be specific, for the query-level knob tuning mode, one configuration knob set may be determined for one query statement. The configuration knob set includes one target configuration knob group for the query statement, and the target configuration knob group is configured for the database when the query statement is executed.

In a possible implementation of the first aspect, when the target knob tuning mode is the workload-level knob tuning mode, the method further includes: fusing the N target feature vectors, to obtain a unified vector obtained after fusion; and the determining, based on the N target feature vectors and current status information of the database, a configuration knob set that is of the database and that corresponds to the N query statements includes: determining, based on the unified vector and the current status information of the database, the configuration knob set that is of the database and that corresponds to the N query statements, where the configuration knob set includes one target configuration knob group, and the one target configuration knob group is used to tune, when the N query statements are executed, a configuration knob currently used for the database. It can be learned from this possible implementation of the first aspect that in the workload-level knob tuning mode, knob tuning may be performed once for the N query statements, to meet a requirement of a scenario in which there is a large throughput.

In a possible implementation of the first aspect, when the target knob tuning mode is the cluster-level knob tuning mode, the determining, based on the N target feature vectors and current status information of the database, a configuration knob set that is of the database and that corresponds to the N query statements includes: determining N configuration knob groups based on the N target feature vectors and the current status information of the database, where the N configuration knob groups are in a one-to-one correspondence with the N target feature vectors; and performing clustering on the N configuration knob groups, to obtain Q target configuration knob groups, where a first configuration knob group corresponds to at least one target feature vector, the first configuration knob group is any one of the Q target configuration knob groups, Q is an integer greater than 0, Q<N, and the first configuration knob group is used to tune, when a query statement corresponding to the at least one target feature vector is executed, a configuration knob currently used for the database. It can be learned from this possible implementation of the first aspect that in the cluster-level knob tuning mode, one target configuration knob group may be determined for a same type of query statement, to ensure a large throughput and meet a requirement for a low delay.

In a possible implementation of the first aspect, first query information in the N pieces of query information includes a first query type, first table information, and a type and corresponding cost information of an involved operator in a query, and the first query information is any one of the N pieces of query information; the first query type is used to indicate a type of an operation that is requested by a query statement corresponding to the first query information and that is to be performed on the database; the first table information is used to indicate a relationship table involved when the query statement corresponding to the first query information is executed in the database; and the cost information is used to indicate a respective execution cost that is of the involved operator and that is incurred when the involved operator executes the query statement corresponding to the first query information.

In a possible implementation of the first aspect, a target feature vector corresponding to the first query information includes an identifier of the first query type, an identifier of a second query type, an identifier of the first table information, an identifier of second table information, and a floating-point bit of each type of operator; the identifier of the first query type is represented by using a first value, the identifier of the second query type is represented by using a second value, and the second query type belongs to a query type of the database and is not included in the first query information; the identifier of the first table information is represented by using a third value, the identifier of the second table information is represented by using a fourth value, and the second table information belongs to table information of the database and is not included in the first query information; and the floating-point bit of each type of operator includes an execution cost of the corresponding type of operator.

In this possible implementation, the identifier may be a bit identifier, or may be a floating-point bit identifier. When the identifier is a bit identifier, 1 may be used to indicate the first query type, and 0 may be used to indicate the second query type; or T may be used to indicate the first query type, and F may be used to indicate the second query type. Alternatively, another bit representation manner may also be applicable to this solution. When the identifier is a floating-point bit identifier, all involved query types may be marked by using different characters. For example, insert (insert) is represented by using 1, select (select) is represented by using 2, update (update) is represented by using 3, and delete (delete) is represented by using 4. Certainly, the four query types are merely used as an example for description herein. The query types are not limited to the four query types, and representations of the query types are not limited to the listed numerical form herein. Different query types may be represented by using another symbol or numerical form.

In a possible implementation of the first aspect, the execution cost of the corresponding type of operator is a normalized execution cost.

In a possible implementation of the first aspect, the determining, based on the N target feature vectors and current status information of the database, a configuration knob set that is of the database and that corresponds to the N query statements includes: determining, based on the N target feature vectors and the current status information of the database by using a double-state deep reinforcement learning (DS-DRL) model, the configuration knob set that is of the database and that corresponds to the N query statements. The DS-DRL model can process data in two aspects of a feature vector of a query statement and state information of the database, to obtain a configuration knob that is of the database and that is applicable to the query statement.

In a possible implementation of the first aspect, the DS-DRL model includes a prediction model, an environment model, and an agent model; the determining, based on the N target feature vectors and the current status information of the database by using a double-state deep reinforcement learning (DS-DRL) model, the configuration knob set that is of the database and that corresponds to the N query statements includes: predicting a status information change amount ΔS of the database based on the N target feature vectors by using the prediction model, where ΔS is an amount of a change from status information that is of the database and that exists before the N query statements are executed to status information that is of the database and that is obtained after the N query statements are executed; determining, by using the environment model and based on ΔS and the status information S that is of the database and that exists before the N query statements are executed, simulated status information S' that is of the database and that is obtained after the N query statements are executed in a simulated manner; determining a recommended configuration knob set based on the simulated status information S' by using the agent model; performing simulated configuration based on the recommended configuration knob set by using the environment model, executing the N target feature vectors, to update S and S', and determining a representation value R obtained after the N target feature vectors are executed; updating a knob tuning policy based on the representation value R by using the agent model, and determining an updated recommended configuration knob set based on the updated simulated status information S'; and if the representation value R meets a preset condition, determining that the updated recommended configuration knob set is the configuration knob set; or if the representation value R does not meet a preset condition, repeatedly performing the foregoing process in which the environment model updates S and S' and the agent model determines the updated recommended configuration knob set, until the representation value R meets the preset condition, where an updated recommended configuration knob set corresponding to a value R that meets the preset condition is the configuration knob set. It can be learned from this possible implementation that the DS-DRL model implements, through cooperation among the prediction model, the environment model, and the agent model, the foregoing process of determining the configuration knob set, to ensure accuracy of the configuration knob set.

In this possible implementation, meeting the preset condition may include that the value R exceeds a preset threshold, or a pre-specified resource limitation condition is reached. For example, iteration is performed for a predetermined quantity of times, or iteration is performed for preset duration.

In a possible implementation of the first aspect, when the DS-DRL model is a double-state deep deterministic policy gradient (DS-DDPG) model, the agent model includes an actor model and a score (critic) model; and the determining a recommended configuration knob set based on the simulated status information S' by using the agent model includes: determining the recommended configuration knob set based on the simulated status information S' by using the actor model; and determining a score of the recommended configuration knob set based on the simulated status information S' and the recommended configuration knob set by using the critic model.

In a possible implementation of the first aspect, the updating a knob tuning policy based on the representation value R may include: updating a weight of the actor model based on the score by using the actor model.

In a possible implementation of the first aspect, the updating a knob tuning policy based on the representation value R may include: updating a weight of the critic model based on the representation value R by using the critic model.

According to a second aspect, an apparatus for determining a configuration knob of a database is provided, and is configured to perform the method in any one of the first aspect or the possible implementations of the first aspect. Specifically, the apparatus includes modules or units configured to perform the method in any one of the first aspect or the possible implementations of the first aspect.

According to a third aspect, an apparatus for determining a configuration knob of a database is provided. The apparatus may include at least one processor, a memory, and a communications interface. The processor is coupled to the memory and the communications interface. The memory is configured to store instructions, the processor is configured to execute the instructions, and the communications interface is configured to communicate with another network element under control of the processor. When the instructions are executed by the processor, the processor is enabled to perform the method in any one of the first aspect or the possible implementations of the first aspect.

According to a fourth aspect, a database system is provided. The database system includes the apparatus for determining a configuration knob of a database according to the second aspect or the third aspect and a database.

According to a fifth aspect, a computer-readable storage medium is provided. The computer-readable storage medium stores a program, and the program enables a data query apparatus to perform the method for determining a configuration knob of a database in any one of the first aspect and the implementations of the first aspect.

According to a sixth aspect, a computer program product is provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device implements the method for determining a configuration knob of a database in any one of the first aspect or the possible implementations of the first aspect.

It may be understood that any apparatus for determining a configuration knob of a database, the computer storage medium, or the computer program product provided above are all used to perform the corresponding method for determining a configuration knob of a database provided above. Therefore, for beneficial effects that can be achieved, refer to beneficial effects in the corresponding method provided above. Details are not described herein again.

BRIEF DESCRIPTION OF DRAWINGS

FIG. 11A and FIG. 11B are a schematic diagram of another embodiment of a method for determining a configuration knob of a database according to an embodiment of this application;

DESCRIPTION OF EMBODIMENTS

The following describes embodiments of this application with reference to accompanying drawings. It is clear that the described embodiments are merely some rather than all of the embodiments of this application. A person of ordinary skill in the art may learn that technical solutions provided in the embodiments of this application are also applicable to similar technical problems with development of technologies and emergence of new scenarios.

In the specification, claims, and the accompanying drawings of this application, terms "first", "second", and the like are intended to distinguish similar objects but do not necessarily indicate a specific order or sequence. It should be understood that data used in such a way is interchangeable in proper circumstances, so that the embodiments described herein can be implemented in other orders than the order illustrated or described herein. Moreover, terms "include", "have" and any other variants mean to cover the nonexclusive inclusion, for example, a process, method, system, product, or device that includes a list of steps or units is not necessarily limited to those steps or units, but may include other steps or units not expressly listed or inherent to such a process, method, system, product, or device.

Figure 1:
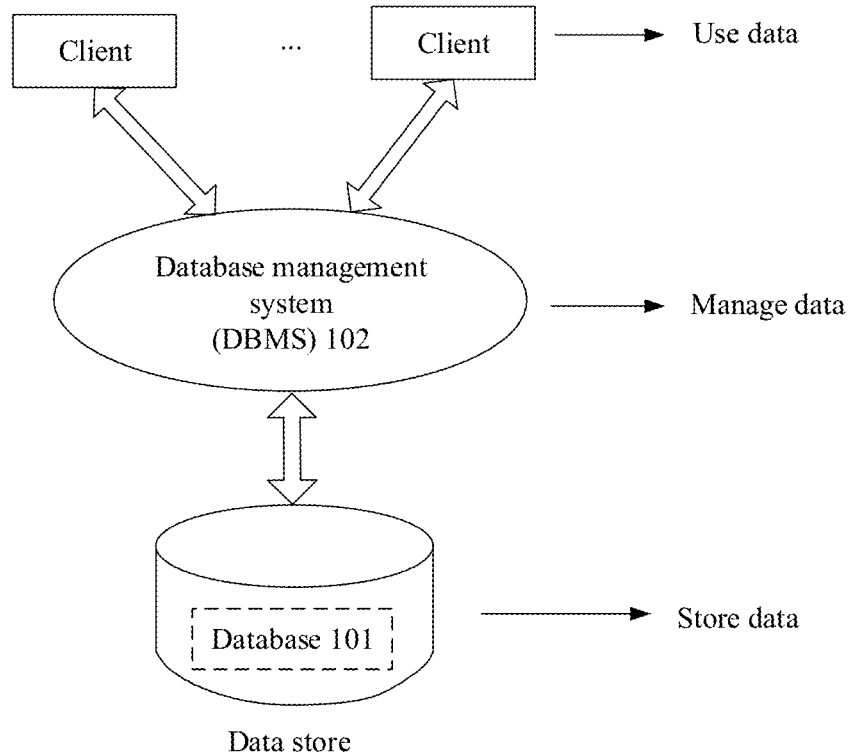
FIG. 1 is a schematic diagram of an architecture of a database system according to an embodiment of this application.

An architecture of a database system to which the embodiments of this application are applied is shown in FIG. 1. The database system includes a database 101 and a database management system (DBMS) 102.

The database 101 is an organized data set stored in a data store for a long time, in other words, an associated data set that is organized, stored, and used by using a specific data model. For example, the database 101 may include one or more pieces of table data.

The DBMS 102 is configured to: establish, use, and maintain the database 101, and uniformly manage and control the database 101, to ensure security and integrity of the database 101. A user may access data in the database 101 by using the DBMS 102, and a database administrator (DBA) also maintains the database by using the DBMS 102. The DBMS 102 provides various functions, so that a plurality of applications and user equipments can establish, modify, and query the database in different methods at a same moment or at different moments. The application and the user equipment may be collectively referred to as a client. The DBMS 102 may provide the following functions: (1) Data definition function: The DBMS 102 provides a data definition language (DDL) to define a database structure. The DDL is used to describe a database framework and may be stored in a data dictionary. (2) Data access function: The DBMS 102 provides a data manipulation language (DML) to implement a basic access operation on data in the database, for example, retrieval, insertion, modification, and deletion. (3) Database running management function: The DBMS 102 provides a data control function, to be specific, data security, integrity, concurrency control, and the like, to effectively control and manage running of the database, and ensure correct and effective data. (4) Database establishment and maintenance function, including functions such as loading initial data into the database, dumping, restoring, and re-organizing the database, and monitoring and analyzing system performance. (5) Database transmission: The DBMS 102 provides processed data transmission to implement communication between a client and the DBMS 102, usually in coordination with an operating system.

Figure 2:
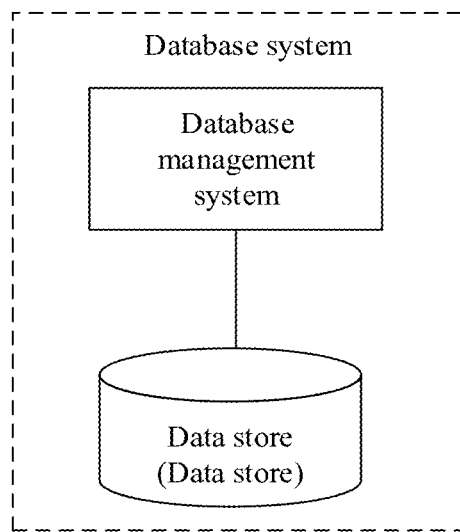
FIG. 2 is a schematic diagram of another architecture of a database system according to an embodiment of this application.

Specifically, FIG. 2 is a schematic diagram of a single-server database system. The single-server database system includes a database management system and a data store (data store). The database management system is configured to provide a service such as query and modification of a database, and the database management system stores data in the data store. In the single-server database system, the database management system and the data store are usually located on a single server, for example, a symmetric multiprocessor (SMP) server. The SMP server includes a plurality of processors. All the processors share resources such as a bus, a memory, and an I/O system. A function of the database management system may be implemented by executing a program in the memory by one or more processors.

Figure 3:
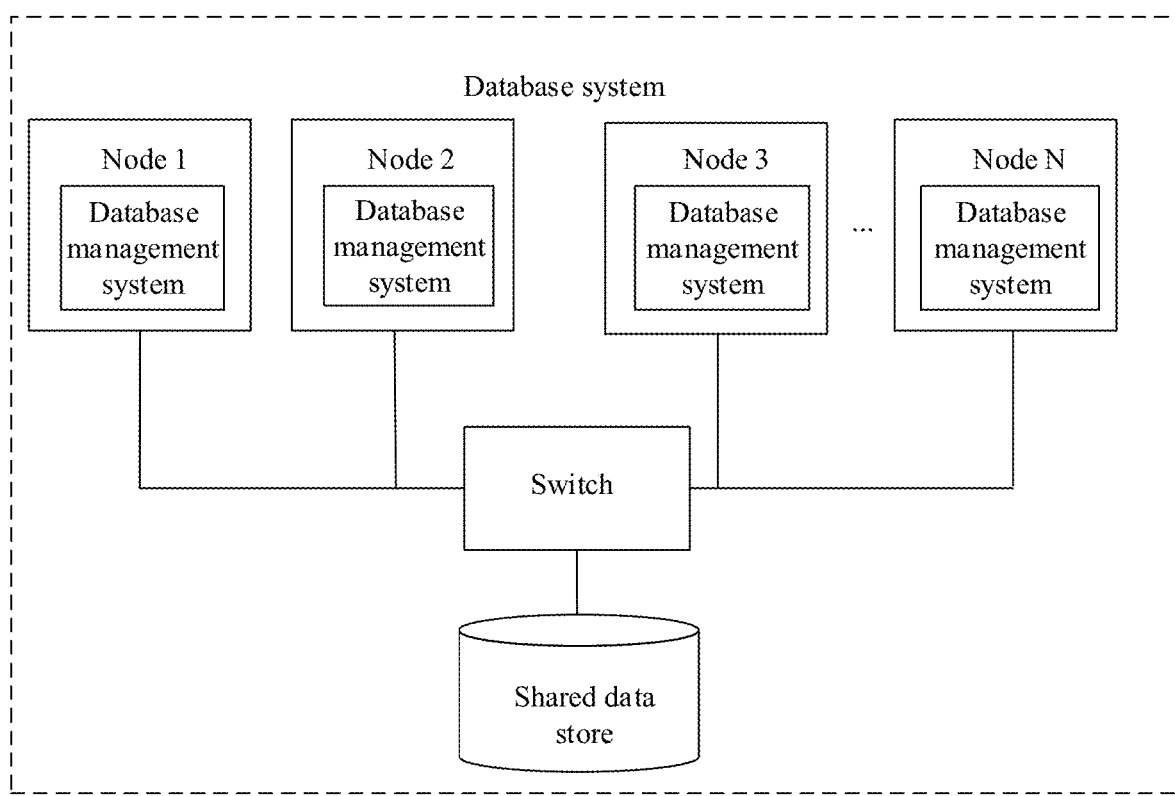
FIG. 3 is a schematic diagram of still another architecture of a database system according to an embodiment of this application.

FIG. 3 is a schematic diagram of a cluster database system in which a shared-storage architecture is used. The cluster database system includes a plurality of nodes (nodes 1-N in FIG. 3). A database management system is deployed on each node to separately provide services such as database query and modification for a user. A plurality of database management systems store shared data in a shared data store, and perform a read/write operation on data in the data store by using a switch. The shared data store may be a shared disk array. A node in the cluster database system may be a physical machine, for example, a database server, or may be a virtual machine running on an abstract hardware resource. If the node is a physical machine, the switch is a storage area network (SAN) switch, an Ethernet switch, a fibre channel switch, or another physical switch device. If the node is a virtual machine, the switch is a virtual switch.

Figure 4:
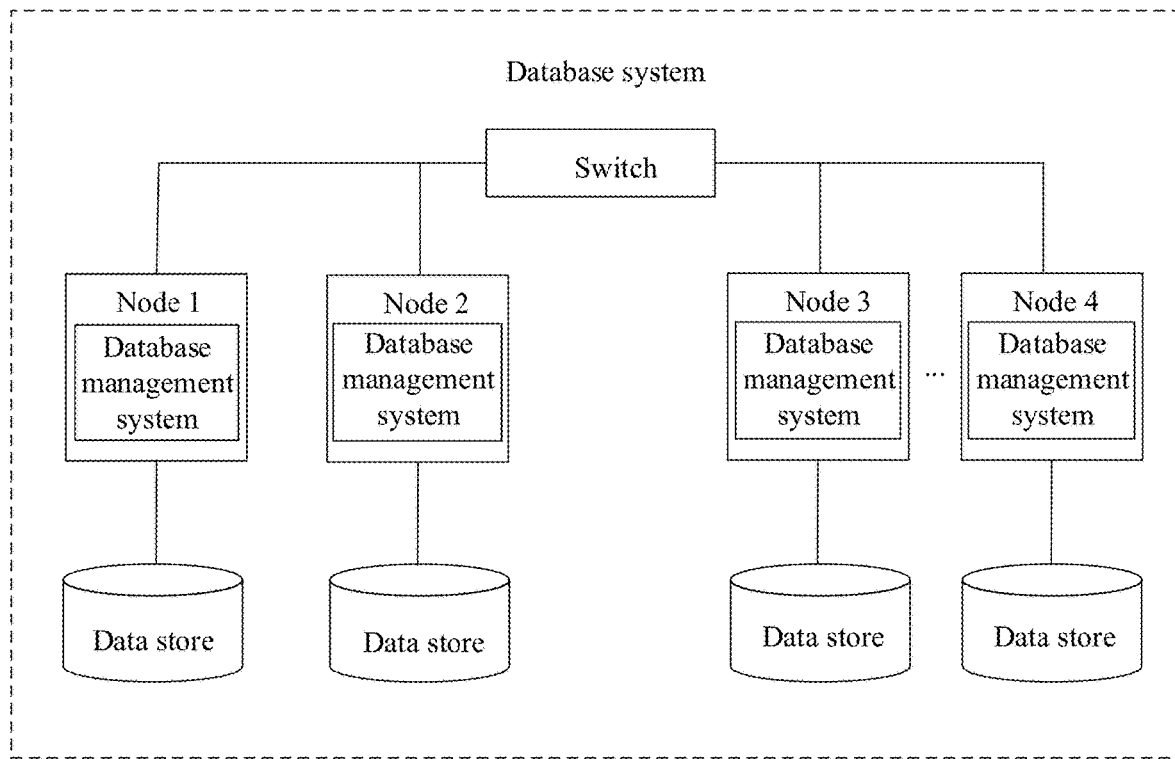
FIG. 4 is a schematic diagram of yet another architecture of a database system according to an embodiment of this application.

FIG. 4 is a schematic diagram of a cluster database system of a shared-nothing architecture. Each node has an exclusive hardware resource (for example, a data store), an operating system, and a database, and nodes communicate with each other by using a network. In this system, data is distributed to each node based on a database model and an application characteristic. A query task is divided into several parts, and the parts are executed concurrently on all the nodes. All the nodes perform calculation coordinately and serve as a whole to provide a database service. All communications functions are implemented in a high-bandwidth network interconnection system. Similar to the cluster database system of the shared disk architecture that is described in FIG. 3, the node herein may be a physical machine or may be a virtual machine.

In all the embodiments of this application, the data store (data store) of the database system includes but is not limited to a solid-state disk (SSD), a disk array, or anon-transitory computer-readable medium of another type. Although no database is shown in FIG. 2 to FIG. 4, it should be understood that the database is stored in the data store. A person skilled in the art may understand that a communications system may include fewer or more components than those shown in FIG. 2 to FIG. 4, or include components different from those shown in FIG. 2 to FIG. 4. FIG. 2 to FIG. 4 show only components more related to an implementation disclosed in the embodiments of this application. For example, although four nodes are described in FIG. 3 and FIG. 4, a person skilled in the art may understand that the cluster database system may include any quantity of nodes. A function of a database management system of each mode may be implemented by using an appropriate combination of software, hardware, and/or firmware on the node.

A person skilled in the art may clearly understand according to teachings of the embodiments of the present invention that, a method in the embodiments of the present invention is applied to a database management system. The database management system may be applied to a single-server database system, a cluster database system of a shared-nothing architecture, a cluster database system of a shared-storage architecture, or a database system of another type.

Further, referring to FIG. 1, when querying the database 101, the DBMS 102 usually needs to perform steps such as syntax analysis, pre-compiling, and optimization on a query statement, obtains through estimation an execution method having a cost that the database system considers to be minimum, and further generates an execution plan with the minimum cost. During operation, an execution structure performs a data operation according to the generated execution plan, so as to improve performance of the database system. When performing cost estimation on the query statement, the DBMS 102 needs to collect statistical information of the query statement, and performs cost estimation based on the collected statistical information. A statistical information collection method may be model information obtained by performing model training through machine learning, or statistical information obtained through data sampling and statistics collection. The model information may alternatively be referred to as statistical information.

Figure 5:
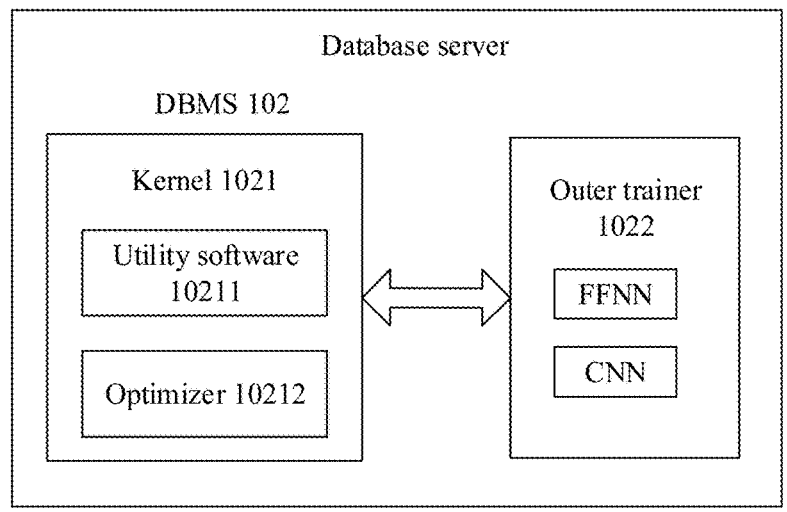
FIG. 5 is a schematic diagram of a structure of a database server according to an embodiment of this application.
Figure 6:
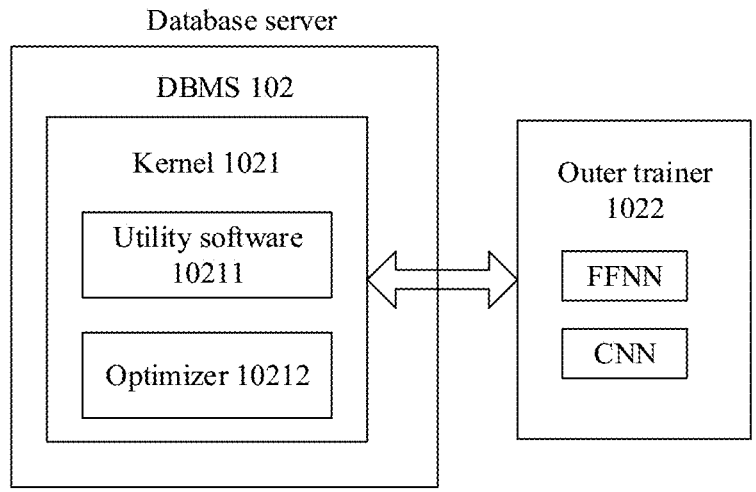
FIG. 6 is a schematic diagram of another structure of a database server according to an embodiment of this application.

The DBMS 102 may be located in a database server. For example, the database server may be specifically the SMP server in the single-server database system in FIG. 2 or the node in FIG. 3 or FIG. 4. Specifically, as shown in FIG. 5, the database server may include a kernel 1021 and an external trainer 1022 that is independent of the kernel 1021 and that is located in the database server. Alternatively, as shown in FIG. 6, the database server includes a kernel 1021, and an external trainer 1022 is located outside the database server. The kernel 1021 is a core of the database server and may be configured to perform various functions provided by the DBMS 102. The kernel 1021 may include a utility 10211 and an optimizer 10212. When the database server queries the database 101, the utility 10211 may trigger the external trainer 1022 to perform model training through machine learning, to obtain model information of a training model. The optimizer 10212 may perform cost estimation based on the model information obtained through training performed by the external trainer 1022, to generate the execution plan with the minimum cost, so that the execution structure performs the data operation according to the generated execution plan, so as to improve the performance of the database system.

Figure 7:
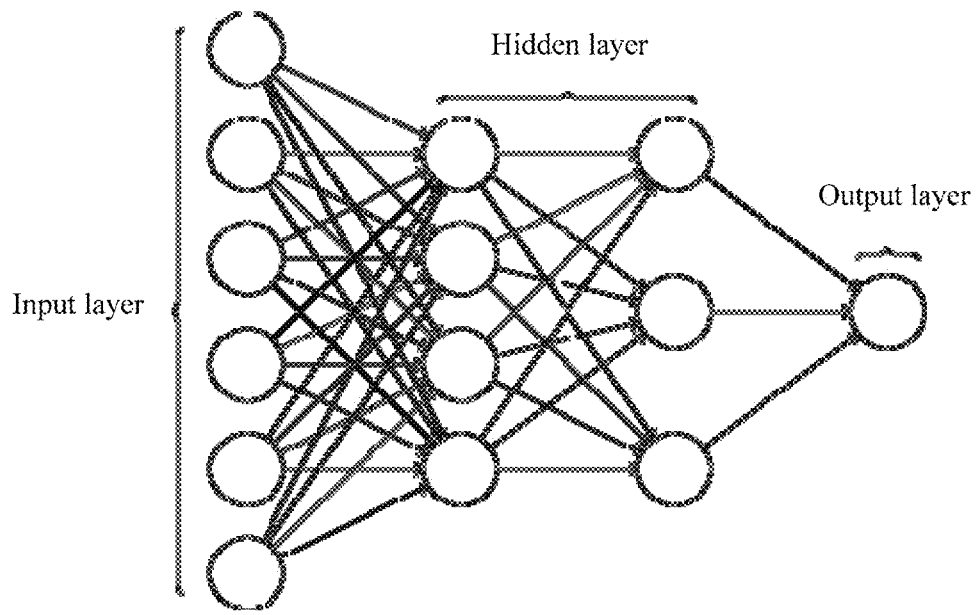
FIG. 7 is a schematic diagram of a neural network model according to an embodiment of this application.

Machine learning is a process of obtaining a new inference model by relying on learning or observation of existing data. Machine learning may be implemented by using a plurality of different algorithms, and common machine learning algorithms may include: models such as a neural network (NN) and a random forest (RF). For example, the neural network may include a feed forward neural network (FFNN) and a recurrent neural network (RNN). FIG. 7 is a schematic diagram of a model of a neural network. The model may include an input layer, a hidden layer, and an output layer. The layers may include different quantities of neurons.

Because a quantity of clients that request a database to provide a service is not fixed, to enable the database to have better performance (for example, performance in aspects of a delay and a throughput) when the database provides a service for a client, an embodiment of this application provides a method for determining a configuration knob of a database. In this method, a double-state-based configuration knob tuning solution is provided. The double states may be a feature vector of a query statement and state information of the database (database states). The feature vector of the query statement affects statistical information of each activity of the database. In other words, the query statement or a workload may affect the statistical information of each activity of the database. The state information of the database may include an internal configuration of the database, and the configuration is affected by knob tuning behavior. The double-state-based configuration knob tuning solution provided in this embodiment of this application may be implemented by using a double-state deep reinforcement learning (DS-DRL) model. The DS-DRL model may process data in two aspects of the feature vector of the query statement and the state information of the database, to obtain a configuration knob that is of the database and that is suitable for the query statement. The DS-DRL model may have a plurality of specific representation forms. For example, one representation form may be a double-state deep deterministic policy gradient (DS-DDPG) model. Specific structures of the DS-DRL model and the DS-DDPG model and functions in a process of determining a configuration knob of a database are described below. Details are not described herein.

In this embodiment of this application, the double-state-based configuration knob tuning solution includes knob tuning modes at three granularities, and the knob tuning modes at three granularities are a query-level knob tuning mode (query-level tuning), a workload-level knob tuning mode (workload-level tuning), and a cluster-level knob tuning mode (cluster-level tuning). Specific content of the knob tuning modes at three granularities in the process of determining a configuration knob of a database is described below. Details are not described herein.

Because the method for determining a configuration knob of a database provided in this embodiment of this application is applied to a DBMS, the DBMS provides, for the DB, a configuration knob set that matches a workload, and further tunes the configuration knob of the DB based on the configuration knob set. Because both the DBMS and the DB belong to a database system, the following describes the process of determining a configuration knob of a database in this embodiment of this application with reference to FIG. 8.

Figure 8:
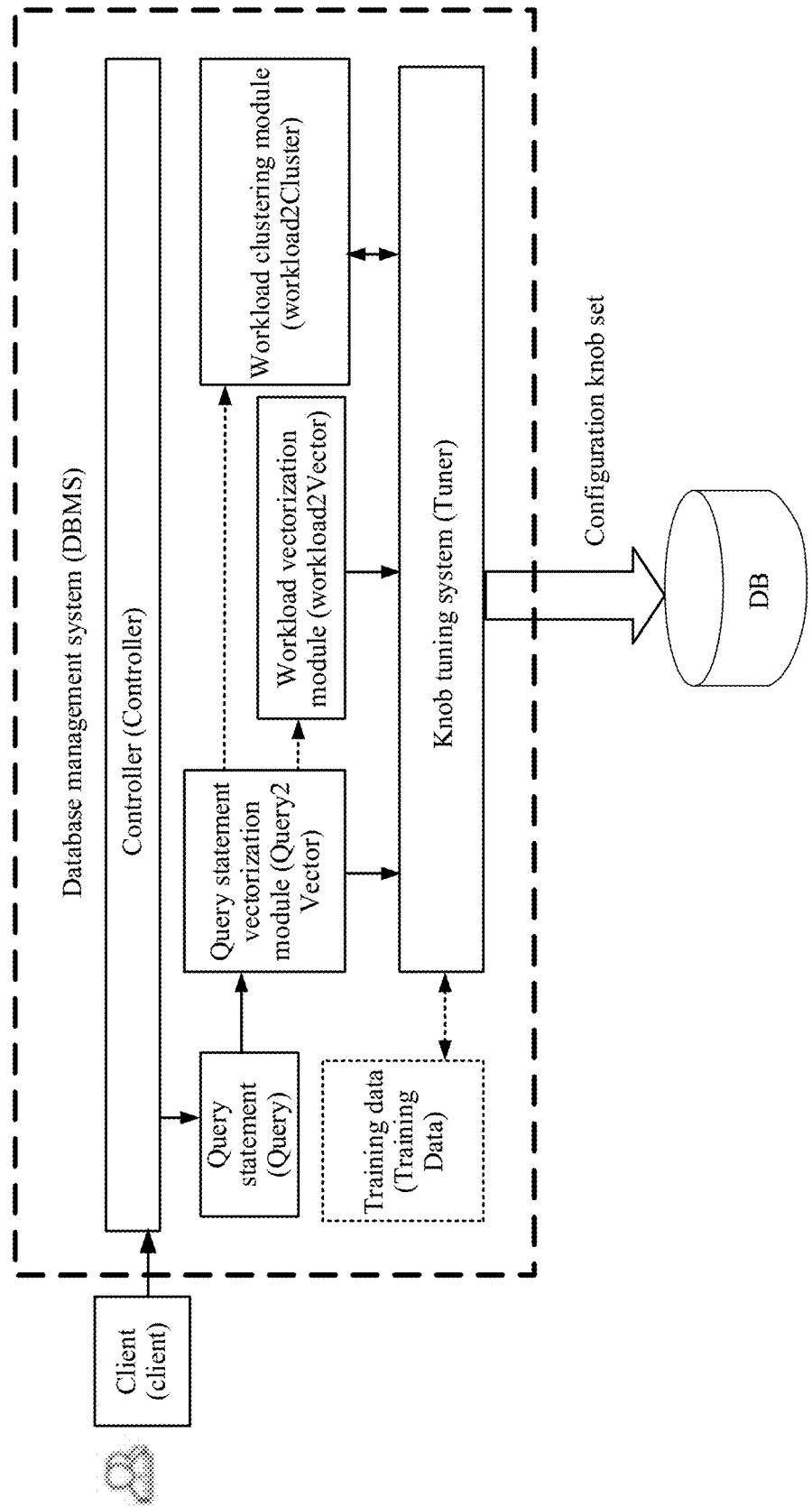
FIG. 8 is a schematic diagram of still yet another architecture of a database system according to an embodiment of this application.

FIG. 8 is a schematic diagram of still yet another architecture of a database system according to an embodiment of this application.

As shown in FIG. 8, the database system includes a DBMS and a DB. A function of the DB is basically the same as that described in the embodiment corresponding to FIG. 1, and details are not described herein again. In addition, it should be noted that the DB may tune, based on a configuration knob set provided by the DBMS, a configuration knob used for the DB.

The DBMS may include a controller, a query statement vectorization module (Query2Vector), a workload vectorization module (Workload2Vector), a workload clustering module (Workload2Cluster), and a knob tuning system (tuner). The DBMS may further include a training knob set storage module. If the training knob set storage module is included, the module stores training data. It should be noted that "2" in (Query2Vector) indicates a meaning of "to" in English, and indicates that a query statement is converted into a vector. "2" in other modules also has a same meaning, and is not listed one by one herein.

The training data is mainly used to train a DS-DRL model. If the DS-DRL model is trained offline, the database system may alternatively not include the training knob set storage module. In a possible implementation, even if the DS-DRL model is trained offline, the database system may still include the training knob set storage module. In a knob tuning process, new data generated by the knob tuning system may also be updated to the training data of the training knob set storage module, to optimize the DS-DRL model online.

A quantity of clients shown in FIG. 8 is not limited. There may be one client, or there may be two or more clients.

When using a database, the client sends a query statement (query). The query statement may be sent in a manner of a query request.

Figure 9:
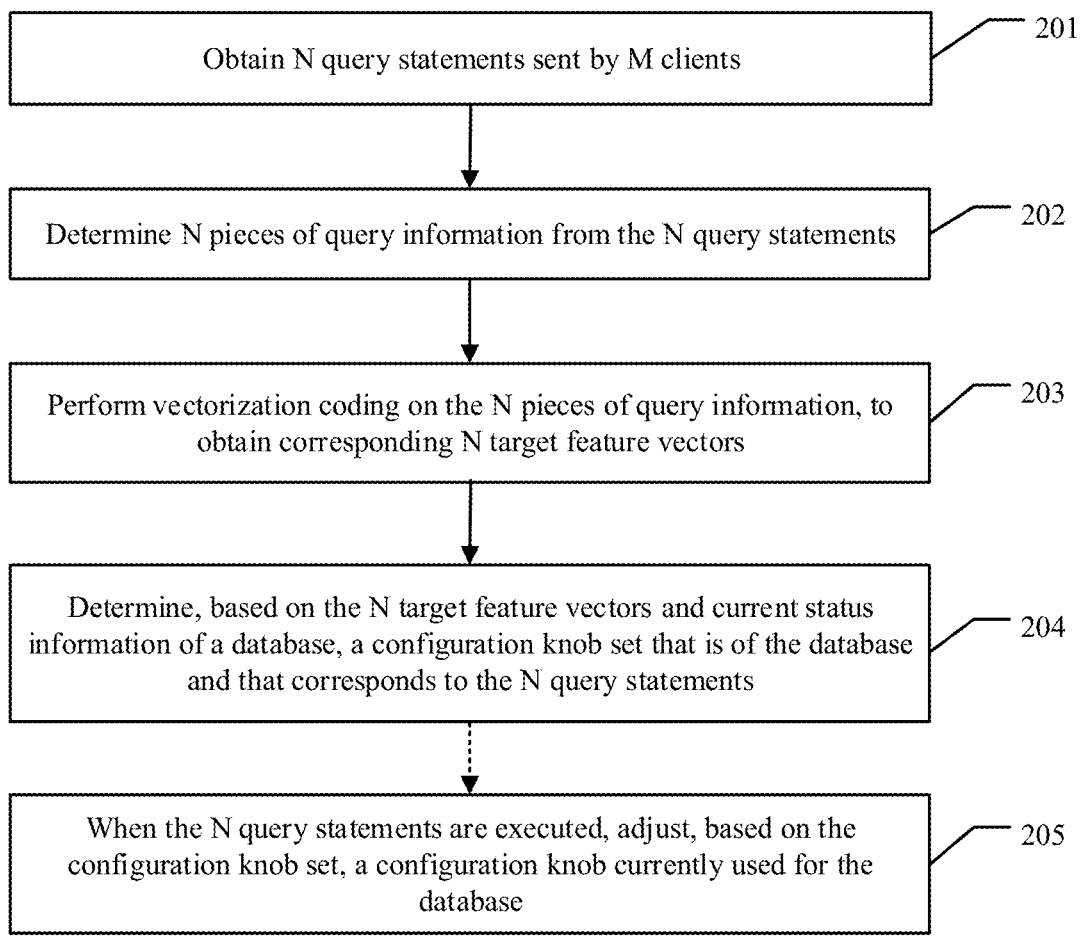
FIG. 9 is a schematic diagram of an embodiment of a method for determining a configuration knob of a database according to an embodiment of this application.

The DBMS may perform a process of a method for determining a configuration knob of a database in FIG. 9.

As shown in FIG. 9, an embodiment of a method for determining a configuration knob of a database provided in an embodiment of this application may include the following steps.

201: Obtain N query statements sent by M clients.

M is an integer greater than 0, N is an integer greater than 0, and N≥M.

In this embodiment of this application, there may be only one client, or there may be two or more clients. One client may send one query statement, or may send two or more query statements.

202: Determine N pieces of query information from the N query statements.

The N query statements are in a one-to-one correspondence with the N pieces of query information.

203: Perform vectorization coding on the N pieces of query information, to obtain corresponding N target feature vectors.

The N pieces of query information are in a one-to-one correspondence with the N target feature vectors.

204: Determine, based on the N target feature vectors and current status information of the database, a configuration knob set that is of the database and that corresponds to the N query statements.

The configuration knob set includes at least one target configuration knob group, and the target configuration knob group includes at least one configuration knob. The configuration knob set is used to execute the N query statements.

In a possible implementation, after step 204, step 205 may be further performed.

205: When the N query statements are executed, tune a configuration knob currently used for the database based on the configuration knob set.

A configuration knob tuning manner may be replacing the configuration knob currently used for the database with a configuration parameter in a current configuration parameter set. Alternatively, the configuration knob currently used for the database may be tuned by adding an offset value to or reducing an offset value from a value of the configuration knob currently used for the database.

In a possible implementation, the foregoing steps 201 to 205 may also be performed by a part remained after a controller is removed from a DBMS, and the part is used as an apparatus for determining a configuration knob of a database. In this case, the controller provides an interface for the client to access the database, to forward a query statement. Then, the apparatus for determining a configuration knob of a database performs the foregoing steps 201 to 205.

In this embodiment of this application, the configuration knob of the database may be determined based on a target feature vector of a query statement and the current status information of the database, to ensure good performance of the database in a case of different workload requirements. For example, performance in aspects of a delay and a throughput can be met.

As described above, this embodiment of this application provides knob tuning modes at three granularities, and processes of performing vectorization coding on the query statement in the three knob tuning modes are as follows:

1. In a query-level knob tuning mode (query-level tuning), a query statement vectorization module (Query2Vector) performs vectorization coding on a single query statement, to obtain a target feature vector of the query statement. Then, the target feature vector of the query statement is transferred to a knob tuning system (tuner), and the knob tuning system determines, based on the feature vector of the query statement, a configuration knob set that is of the database and that corresponds to the query statement. In other words, when the query-level knob tuning mode is executed, one configuration knob set is obtained by using the foregoing process, and the configuration knob set includes one target configuration knob group corresponding to the query statement. The one target configuration knob group is used to tune, when the single query statement is executed, the configuration knob currently used for the database. In the query-level knob tuning mode, knob tuning is performed once for one query statement, and a knob tuning delay is very small, so that a personalized knob tuning requirement of different query statements can be met.

2. In a workload-level knob tuning mode (workload-level tuning), a query statement vectorization module (Query2Vector) performs vectorization coding on each of the N query statements, to obtain the N target feature vectors. The N query statements are all query statements that request the database to provide a service. Then, the query statement vectorization module transfers the N target feature vectors to a workload vectorization module (Workload2Vector), the workload vectorization module fuses the N target feature vectors into a unified vector, the workload vectorization module transfers the unified vector to a knob tuning system, and the knob tuning system determines, based on the unified vector, a configuration knob set that is of the database and that corresponds to the N query statements.

A process in which the workload vectorization module fuses the N target feature vectors into the unified vector may be fusing corresponding parts of the N target feature vectors. For example, each target feature vector includes three subvectors: a query type, table information, and cost information. Vector fusion may be performed as follows: The subvector of the query type and the subvector of the table information may be fused based on logic of "and", and the subvector of the cost information may be fused through addition. Certainly, a fusion manner is not limited to the listed fusion manner herein. Some subvectors may be fused based on the logic of "and", and some subvectors may be fused in a manner of a vector product.

In the workload-level knob tuning mode, knob tuning may be performed once for the N query statements, to meet a requirement of a scenario in which there is a large throughput.

3. In a cluster-level knob tuning mode (cluster-level tuning), a query statement vectorization module (Query2Vector) performs vectorization coding on each of the N query statements, to obtain N target feature vectors. The N query statements are all query statements that request the database to provide a service. Then, the query statement vectorization module transfers the N target feature vectors to a knob tuning system, the knob tuning system determines N configuration knob groups for the N target feature vectors, the knob tuning system transfers the N configuration knob groups to a workload clustering module (Workload2Cluster), and the workload clustering module performs clustering on the N configuration knob groups, to obtain Q target configuration knob groups. Then, the workload clustering module transfers the Q target configuration knob groups to the knob tuning system, and the knob tuning system determines, based on the Q target configuration knob groups, the configuration knob set that is of the database and that corresponds to the N query statements. A process in which the workload clustering module performs clustering on the N configuration knob groups to obtain the Q target configuration knob groups may be performing clustering based on a similarity of configuration knobs between groups. For example, clustering may be performed on a same type of configuration knob in two groups in a manner of a Euclidean shortest path.

In the cluster-level knob tuning mode, the knob tuning system determines the N configuration knob groups for the N target feature vectors, and then the workload clustering module performs clustering on the N configuration knob groups, to obtain the Q target configuration knob groups. Actually, a manner of obtaining the Q target configuration knob groups is not limited to such a manner in which the Q target configuration knob groups are obtained based on the N target feature vectors. Alternatively, the workload clustering module may determine the N configuration knob groups based on the N target feature vectors, and perform clustering on the N configuration knob groups, to obtain the Q target configuration knob groups. In this implementation, the workload clustering module may include two parts: a vector-to-knob module (Vector2Pattern) and a knob clustering module (Pattern2Cluster). In this case, content related to clustering may be understood with reference to FIG. 10. The workload vectorization module (Workload2Vector) that is unrelated to clustering is not shown in FIG. 10, but it does not mean that the workload vectorization module does not exist.

Figure 10:
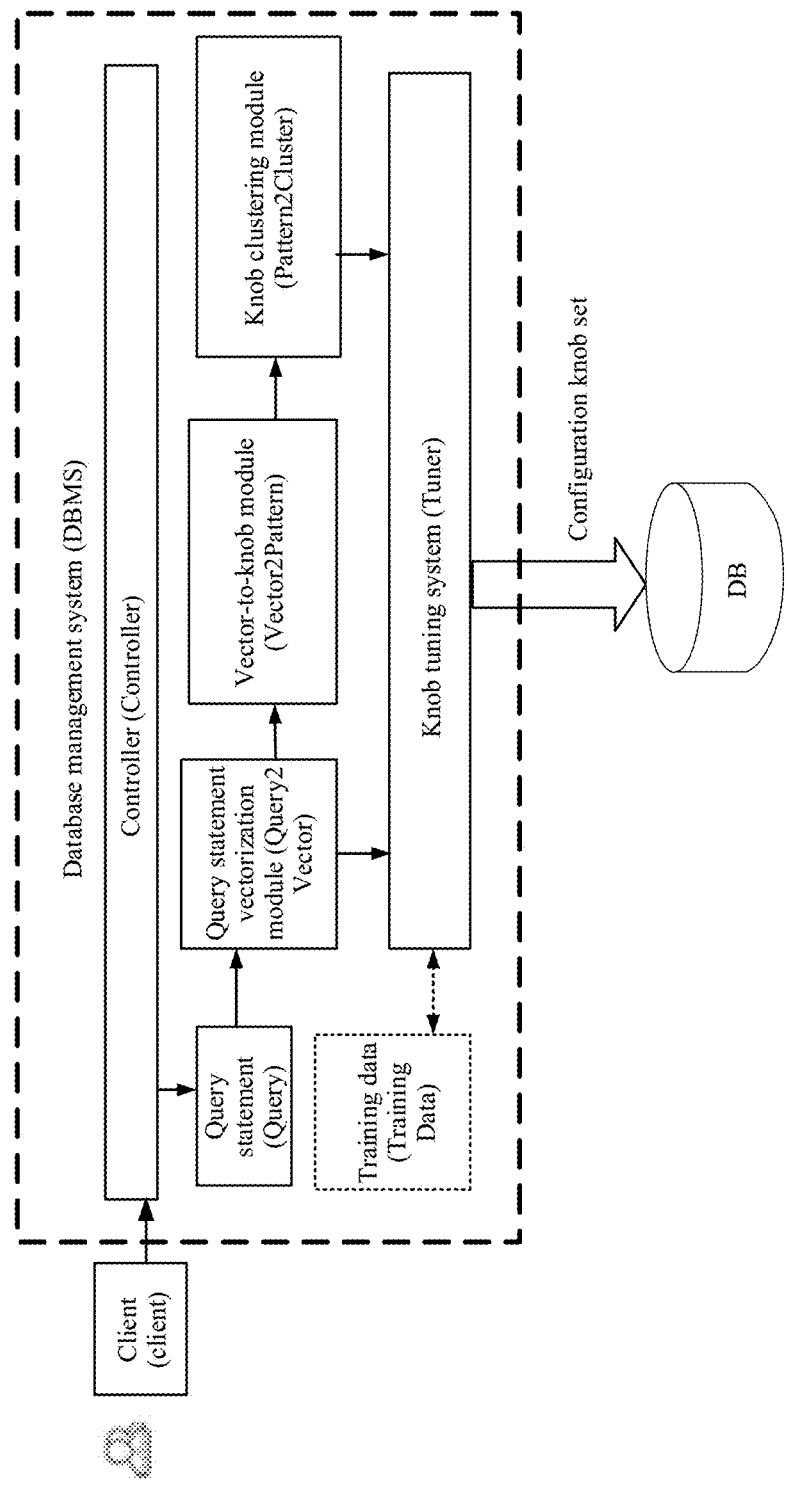
FIG. 10 is a schematic diagram of a further architecture of a database system according to an embodiment of this application.

In a clustering process shown in FIG. 10, the query statement vectorization module transfers the N target feature vectors to the vector-to-knob module, and the vector-to-knob module determines the N configuration knob groups for the N target feature vectors. Then, the vector-to-knob module transfers the N configuration knob groups to the knob clustering module, and the knob clustering module performs clustering on the N configuration knob groups, to obtain the Q target configuration knob groups. The vector-to-knob module may include a deep learning model (deep learning model, DL Model). The DL model may determine a discrete value as a configuration knob. For example, the configuration knob may be determined in {−1, 0, 1} based on a relationship between an estimated value and a default value. Herein, 0 is taken when the estimated value is near the default value; 1 is taken when the estimated value is much greater than the default value; and −1 is taken when the estimated value is much less than the default value. In this solution in which the configuration knob is represented by using the discrete value, a large quantity of calculation overheads can be reduced.

A specific knob tuning mode to be executed may be selected by a user or an administrator based on an actual requirement. In this case, the method for determining a configuration knob of a database provided in this embodiment of this application may further include:
  determining, in response to a mode selection instruction from a query-level knob tuning mode, a workload-level knob tuning mode, and a cluster-level knob tuning mode, a target knob tuning mode used for the N query statements.

In other words, when the target knob tuning mode is the query-level knob tuning mode, M=1, and N=1. To be specific, for the query-level knob tuning mode, one configuration knob set may be determined for one query statement. The configuration knob set includes one target configuration knob group for the query statement, and the target configuration knob group is configured for the database when the query statement is executed.

When the target knob tuning mode is the workload-level knob tuning mode, the method for determining a configuration knob of a database may further include: fusing the N target feature vectors, to obtain a unified vector obtained after fusion. Step 204 may include: determining, based on the unified vector and the current status information of the database, the configuration knob set that is of the database and that corresponds to the N query statements, where the configuration knob set includes a target configuration knob group, and the target configuration knob group is used to tune, when the N query statements are executed, the configuration knob currently used for the database. In the workload-level knob tuning mode, knob tuning may be performed once for the N query statements, to meet a requirement of a scenario in which there is a large throughput.

When the target knob tuning mode is the cluster-level knob tuning mode, the determining, based on the N target feature vectors and current status information of the database, a configuration knob set that is of the database and that corresponds to the N query statements may include:
  determining N configuration knob groups based on the N target feature vectors and the current status information of the database, where the N configuration knob groups are in a one-to-one correspondence with the N target feature vectors; and
  performing clustering on the N configuration knob groups, to obtain Q target configuration knob groups, where a first configuration knob group corresponds to at least one target feature vector, the first configuration knob group is any one of the Q target configuration knob groups, Q is an integer greater than 0, Q<N, and the first configuration knob group is used to tune, when a query statement corresponding to the at least one target feature vector is executed, a configuration knob currently used for the database.

In this cluster-level knob tuning mode, one target configuration knob group may be determined for a same type of query statement, to ensure a large throughput and meet a requirement for a low delay.

Figure 11A:
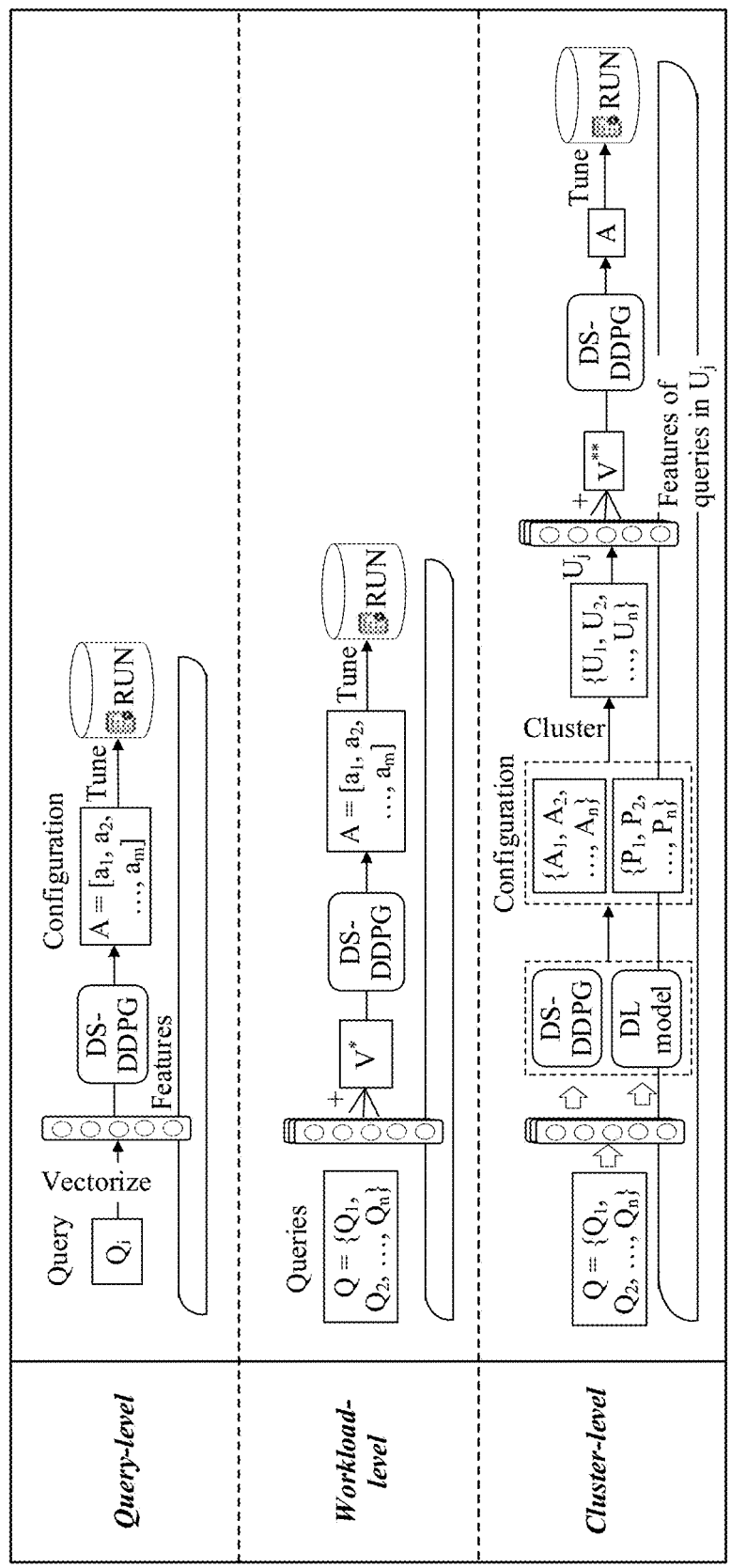

FIG. 8 and FIG. 10 describe a process of determining a configuration knob of a database from a perspective of a modular DBMS. FIG. 11A and FIG. 11B describe, from a perspective of a processing procedure, a process of performing subsequent processing on the N target feature vectors to obtain a configuration knob set, so as to determine the configuration knob of the database in the foregoing embodiment.

FIG. 11A and FIG. 11B show a processing process in the knob tuning modes at three granularities provided in this embodiment of this application, and further extracts a working process of the knob tuning system from the processing process in the knob tuning modes at three granularities and a processing process of vector-to-knob (Vector2Pattern) in the cluster-level knob tuning mode. DS-DDPG is used as an example of a knob tuning model in FIG. 11A and FIG. 11B, but the knob tuning model is not limited to the DS-DDPG.

In FIG. 11A and FIG. 11B, in the query statement-level (query-level) knob tuning mode, after vectorization coding is performed on any query statement $Q_1$, a feature vector can be obtained. After the feature vector is input into the DS-DDPG model, a configuration knob group [$a_1$, $a_2$, ..., $a_m$] for the query statement $Q_i$ may be obtained. In the (query-level) knob tuning mode, a configuration knob set A includes the configuration knob group $[a_1, a_2, \ldots, a_m]$. In other words, $A=[a_1, a_2, \ldots, a_m]$. When the query statement $Q_i$ is executed, the configuration knob set A may be used to determine the configuration knob of the database.

In FIG. 11A and FIG. 11B, in the workload-level (workload-level) knob tuning mode, there are N query statements in a universal set, and the N query statements may be represented as $Q=\{Q_1, Q_2, \ldots, Q_n\}$. Vectorization coding is separately performed on the N query statements, to obtain N target feature vectors. The N target feature vectors are fused into a unified vector V*, and V* is input into the DS-DDPG model, to obtain a configuration knob group $[a_1, a_2, \ldots, a_m]$ for the N query statements $Q=\{Q_1, Q_2, \ldots, Q_n\}$. In the (workload-level) knob tuning mode, a configuration knob set A includes the configuration knob group $[a_1, a_2, \ldots, a_m]$. In other words, $A=[a_1, a_2, \ldots, a_m]$. When the N query statements $Q=\{Q_1, Q_2, \ldots, Q_n\}$ are executed, the configuration knob set A may be used to determine the configuration knob of the database.

In FIG. 11A and FIG. 11B, in the cluster-level (cluster-level) knob tuning mode, there are N query statements in a universal set, and the N query statements may be represented as $Q=\{Q_1, Q_2, \ldots, Q_n\}$. Vectorization coding is separately performed on the N query statements, to obtain N target feature vectors. N configuration knob groups $[A_1, A_2, \ldots, A_n]$ corresponding to the N target feature vectors may be determined by using the DS-DDPG model. Alternatively, N configuration knob groups $[P_1, P_2, \ldots, P_n]$ corresponding to the N target feature vectors may be determined by using a DL model of vector-to-knob (Vector2Pattern). Subsequently, clustering is performed on both the N configuration knob groups $[A_1, A_2, \ldots, A_n]$ and the N configuration knob groups $[P_1, P_2, \ldots, P_n]$, to obtain Q target configuration knob groups $\{U_1, U_2, \ldots, U_q\}$. Then, vectorization coding is performed on each target configuration knob group $U_j$, to obtain vectorization coding V corresponding to $U_j$, and the vectorization coding V corresponding to $U_j$ is input into the DS-DDPG model, to obtain a configuration knob set A corresponding to $U_j$. When the query statement corresponding to $U_j$ is executed, the configuration knob set A may be used to determine the configuration knob of the database.

In the knob tuning modes at three granularities, a working principle of the DS-DDPG model is basically the same. The DS-DDPG model predicts a status change amount $\Delta S=[\Delta s_1, \Delta s_2, \ldots, \Delta s_m]$ of the database based on a target feature vector of a query statement, determines, with reference to current status information $S=[s_1, s_2, \ldots, s_m]$ and based on $S'=\Delta S+S$, that $S'=[S'_1, S'_2, \ldots, S'_m]$, and outputs S' to an actor (actor)-score (critic) module by using S' as a performance value (the performance value may also be referred to as an observation value (observation)). The (actor-critic) module may also be referred to as an (actor-critic) model. The (actor-critic) model determines the configuration knob set A. For a specific knob tuning process of the DS-DDPG model, detailed description is provided below. Details are not described herein.

In the cluster-level (cluster-level) knob tuning mode, in a process of the DL model, the target feature vector of the query statement is used as an input. Then, the target feature configuration knob group $P=[p_1, p_2, \ldots, p_n]$ is obtained after conversion at an input layer (input layer), a hidden layer (hidden layer), and an output layer (output layer).

Figure 12:
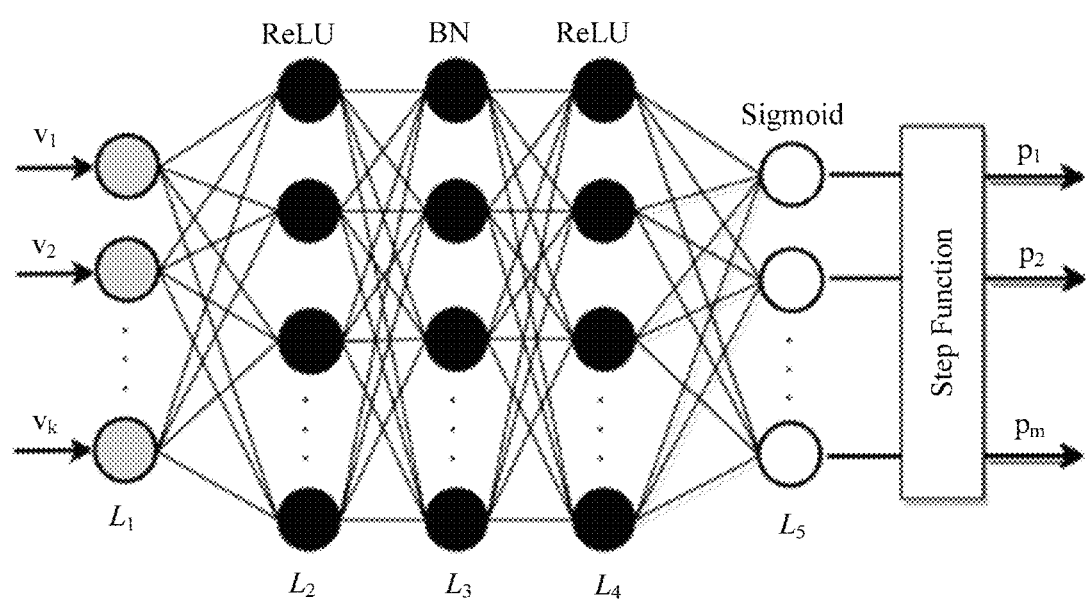
FIG. 12 is another schematic diagram of a neural network model according to an embodiment of this application.

The DL model may also be understood with reference to FIG. 12. L1 is an input layer, L2, L3, and L4 are hidden layers, L5 is an output layer, and target feature vectors $v_1$, and $v_2$ to $v_k$ are input into the L1 layer. Then, after a relationship between L1, L2, L3, L4, and L5, the target feature configuration knob group $P=[p_1, p_2, \ldots, p_n]$ is output.

It can be learned from the foregoing description that in a knob tuning mode at each granularity, vectorization coding needs to be performed on the query statement. Vectorization coding is performed on the query information in the query statement. The query information in this embodiment of this application includes a query type, table information, and a type and corresponding cost information of an involved operator in a query. For example, the query type may include insert (insert), select (select), update (update), and delete (delete). The table information may include identification information of a table, or may include a data volume and a data structure of the table. The type of the involved operator in the query may include types such as sequential scan (Seq_Scan), hash join (Hash_Join), and an aggregation operation (Aggregate). The cost information of the operator is an execution cost of the operator when the query statement is executed. An execution cost of each operator may be calculated in advance based on a query plan of the query statement by using an optimizer. In other words, the execution cost of each operator may be obtained in advance.

Figure 13:
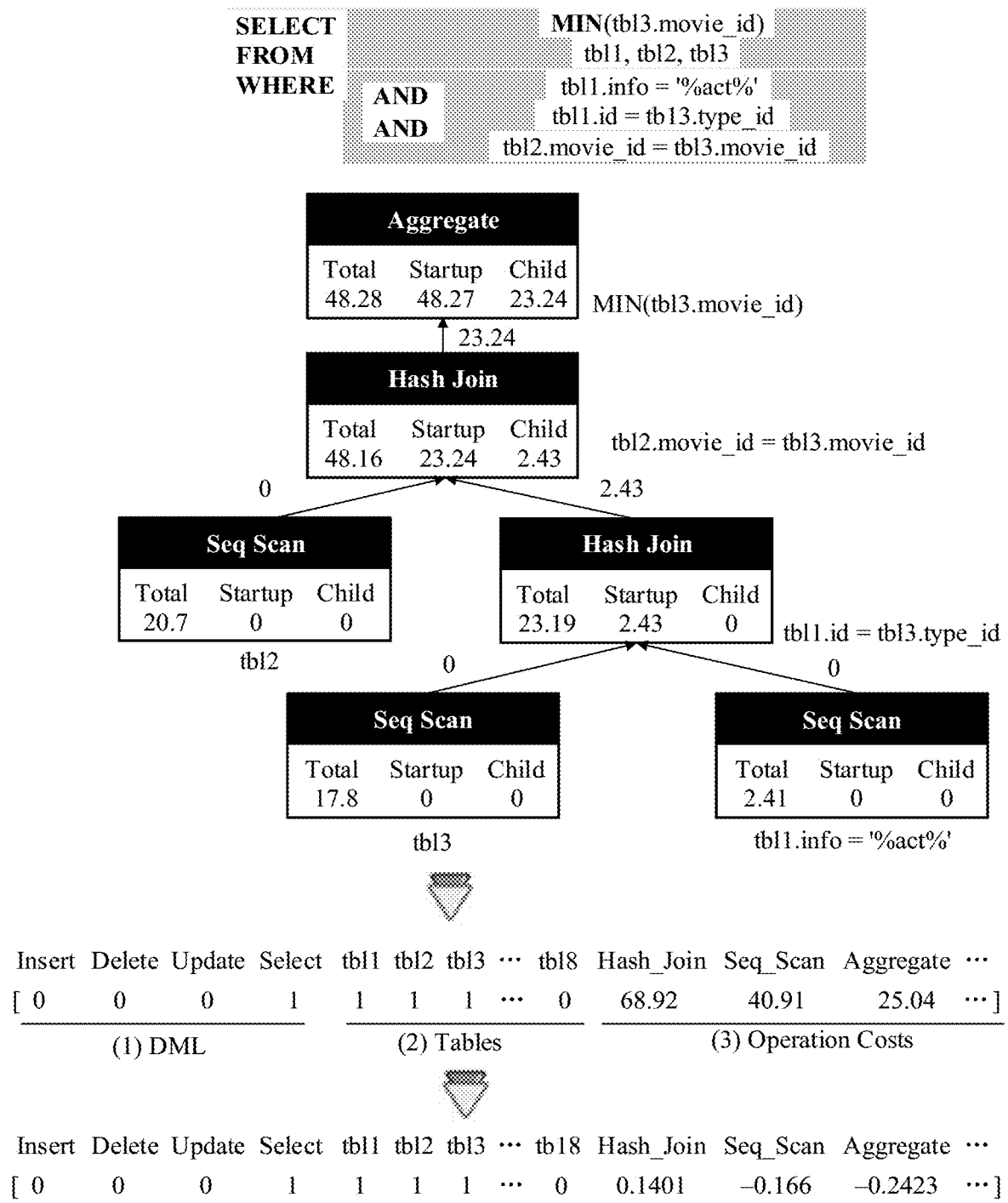
FIG. 13 is a schematic diagram of a query statement vectorization coding process according to an embodiment of this application.

FIG. 13 shows a process of vectorizing a query statement. In the process, an execution cost of an operator is estimated based on the query plan, and then each part of the query plan is vectorized.

As shown in FIG. 13, a template vector may include three parts: a query type (DML), a table (Tables), and an operator cost (Operation Costs).

For the DML, the template vector may include insert (insert), select (select), update (update), and delete (delete). If the query statement is a selection operation, a bit of select is filled with 1, and other bits of insert, update, and delete are filled with 0.

For the table part, if the query plan of the query statement includes table information of three tables: tbl1, tbl2, and tbl3, bits of tbl1, tbl2, and tbl3 are filled with 1, and other bits of tbl4 to tbl8 are filled with 0.

For each type of operator, execution costs of operators of a same type in an operator structure tree may be accumulated, and then a floating-point bit of an operator of a corresponding type is filled with a cost value obtained after accumulation. For example, in FIG. 13, each operator includes a time point of an operation corresponding to a cost estimation, and the time point of the operation corresponding to the cost estimation includes a total time (Total), a start time (Startup), and a child node time (Child). The total time indicates a time point at which all execution results are returned. The start time indicates a time point at which a result starts to be returned. The child node time indicates an earliest time at which a node operator starts to be executed. For any operator node in the query plan, (total time-child node time) can be used to represent a maximum execution cost of the operator node. For example, there are three sequential scanning operators in FIG. 13, and a child node time of each sequential scanning operator is 0. Therefore, a sum of execution costs of the three sequential scanning operators is 2.41+17.8+20.7=40.91. Similarly, an execution cost of the operator Hash_Join is 23.19+48.16-2.43=68.92, and an execution cost of the operator Aggregate is 48.28−23.24=25.04.

The target feature vector of the query statement is obtained after a value is assigned to each of the three parts of the template vector: the query type, the table information, and the operator cost. To eliminate a feature importance difference caused by different value ranges, normalization processing may be performed on the execution costs of these operators, to obtain a target feature vector obtained after normalization processing, and all features are constrained with a same order of magnitude. For example, in a process of generating a final result, a feature whose value is 10000 has a greater proportion than a feature whose value is −1, but both features may have a proportion of 0.5 after normalization. This means that the two features have a same degree of impact.

The DML and the table of the target feature vector are represented by using a bit identifier. Actually, a representation manner is not limited to such a manner of representation performed by using a bit identifier in this embodiment of this application, and representation may alternatively be performed in form of a floating-point bit identifier. When the bit identifier is used for representation, a representation manner is not limited to 0 and 1 in the foregoing representation manner. For example, T may be used to replace 1, F may be used to replace 0, or other representations may be used to replace 1 and 0. When the floating-point bit identifier is used for representation, all involved query types may be marked by using different characters. For example, insert is represented by using 1, select is represented by using 2, update is represented by using 3, and delete is represented by using 4. Certainly, the four query types are merely used as an example for description herein. The query types are not limited to the four query types, and representations of the query types are not limited to the listed numerical form herein. Different query types may be represented by using another symbol or numerical form.

Vectorization is described in a process of assigning a value to the vector template. Actually, if any one of the N pieces of query information is selected, and is referred to as first query information. The process may alternatively be described as follows: The first query information includes a first query type, first table information, and a type and corresponding cost information of an involved operator in a query, the first query type is used to indicate a type of an operation that is requested by a query statement corresponding to the first query information and that is to be performed on the database, the first table information is used to indicate a relationship table involved when the query statement corresponding to the first query information is executed in the database, and the cost information is used to indicate a respective execution cost that is of the involved operator and that is incurred when the involved operator executes the query statement corresponding to the first query information.

A target feature vector corresponding to the first query information includes an identifier of the first query type, an identifier of a second query type, an identifier of the first table information, an identifier of second table information, and a floating-point bit of each type of operator; the identifier of the first query type is represented by using a first value, the identifier of the second query type is represented by using a second value, and the second query type belongs to a query type of the database and is not included in the first query information; the identifier of the first table information is represented by using a third value, the identifier of the second table information is represented by using a fourth value, and the second table information belongs to table information of the database and is not included in the first query information; and the floating-point bit of each type of operator includes an execution cost of the corresponding type of operator. The execution cost of the corresponding type of operator is a normalized execution cost.

The foregoing describes a process of performing vectorization coding on a query statement. The following describes a process of tuning a knob based on a DS-DRL model in a knob tuning system (tuner) and a process of tuning a knob based on a DS-DDPG model.

Figure 14:
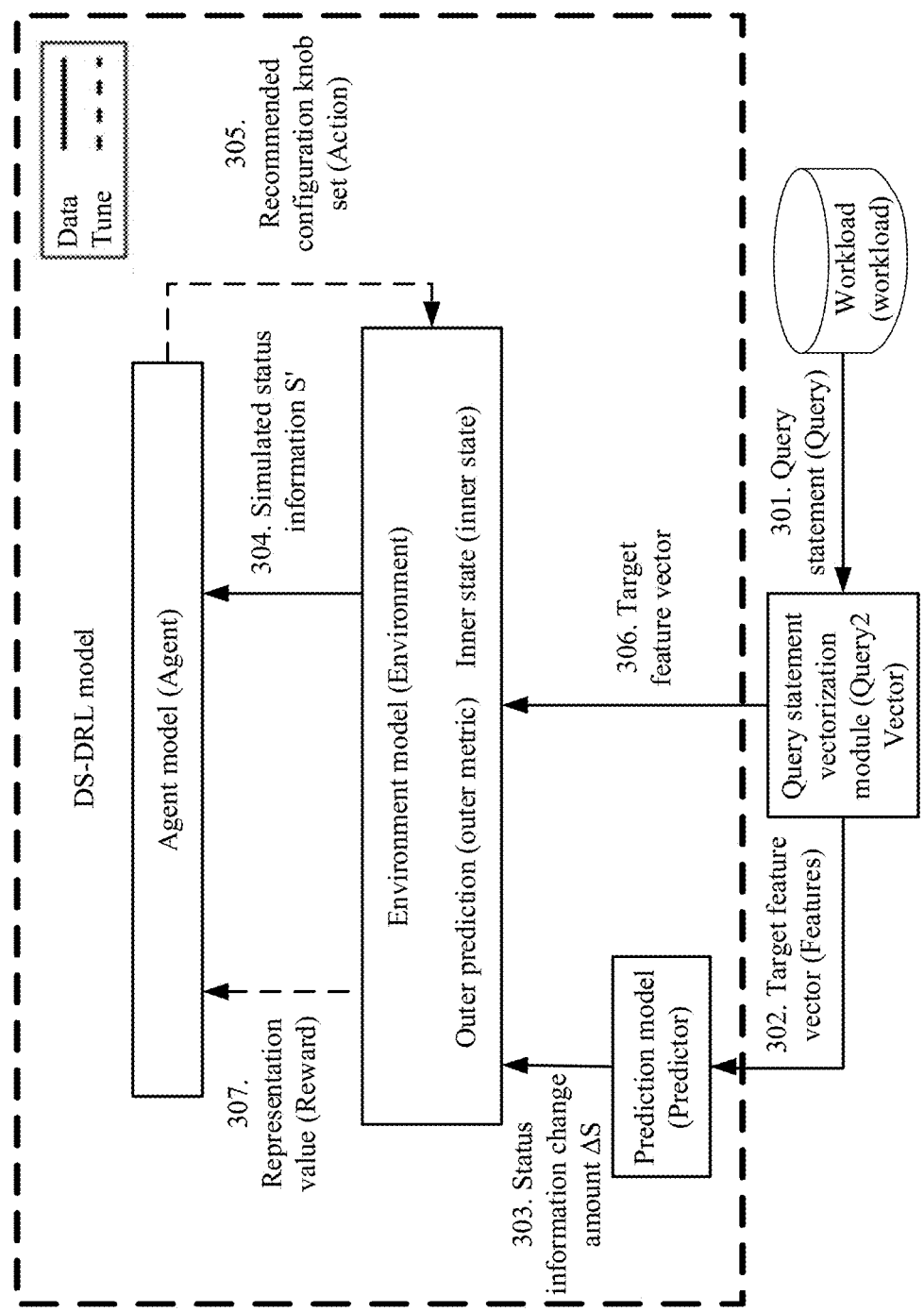
FIG. 14 is a schematic diagram of an architecture of DS-DRL according to an embodiment of this application.

The following first describes a process of tuning a knob based on a DS-DRL model with reference to FIG. 14.

The DS-DRL model includes a prediction model (predictor), an environment model (environment), and an agent model (agent). The environment model includes two parts: outer measurement and an inner state. The process of tuning a knob based on a DS-DRL model may include the following steps.

301: A workload provides a query statement to a query statement vectorization module.

The query statement vectorization module performs the foregoing described vectorization coding process for the query statement, to obtain N target feature vectors.

302: The query statement vectorization module transfers the N target feature vectors to the prediction model.

The prediction model predicts a status information change amount $\Delta S$ of a database based on the N target feature vectors. Herein, $\Delta S$ is an amount of a change from status information that is of the database and that exists before the N query statements are executed to status information that is of the database and that is obtained after the N query statements are executed.

The prediction model may be a neural network model.

303: The prediction model transfers $\Delta S$ to the environment model.

The environment model learns of $\Delta S$, and determines, based on the status information S that is of the database, that exists before the N query statements are executed, and that is stored in an outer state (outer metric), simulated status information S' that is of the database and that is obtained after the N query statements are executed in a simulated manner. A formula may be $S'=\Delta S+S$.

The state information of the database may include utilization of a central processing unit (CPU) of the database, network utilization, a quantity of input/outputs (I/O) of a disk, a busy degree of the disk, a memory page switching amount, and the like.

304: The environment model transfers S' to the agent model.

The agent model uses S' as an input, to generate a recommended configuration knob set (action).

305: The agent model transfers the recommended configuration knob set to the environment model.

The environment model performs simulated configuration based on the recommended configuration knob set.

The environment model further includes the inner state (inner state). The inner state stores a current configuration knob of the database, so that the configuration knob in the inner state can be tuned based on the recommended configuration knob set (action).

306: The query statement vectorization module transfers the N target feature vectors to the environment model.

The environment model executes the N target feature vectors, to update S and S'.

The environment model determines a performance value (reward, R) obtained after the N target feature vectors are executed.

A calculation process of R may be understood with reference to the following formula:

$$R = \sum_{i=1}^{m} w_i r_i$$

Herein, R is the performance value obtained after the N target feature vectors are executed, $w_i$ is a weight of the $i^{th}$ performance indicator in m performance indicators (for example, a delay and a throughput), and $r_i$ is a performance value of the $i^{th}$ performance indicator.

Herein, $$r_i = \begin{cases} ((1+\Delta_{(t-1),t})^2 - 1)|1 + \Delta_{0,t}|, & \Delta_{0,t} > 0 \\ -(((1-\Delta_{(t-1),t})^2 - 1)|1 + \Delta_{0,t}|), & \Delta_{0,t} \leq 0 \end{cases}$$

Herein, $\Delta_{0,t}$ indicates an amount of a change from initial performance to current performance, and $\Delta_{(t-1),t}$ indicates an amount of a change from previous performance to the current performance.

Herein, $$\Delta_{0,t} = \begin{cases} \dfrac{m_t - m_0}{m_0}, & \text{when a larger measurement value indicates better performance} \\ \dfrac{m_0 - m_t}{m_0}, & \text{when a smaller measurement value indicates better performance} \end{cases}$$

Herein, $$\Delta_{(t-1),t} = \begin{cases} \dfrac{m_t - m_{t-1}}{m_{t-1}}, & \text{when a larger measurement value indicates better performance} \\ \dfrac{m_{t-1} - m_t}{m_{t-1}}, & \text{when a smaller measurement value indicates better performance} \end{cases}$$

Herein, $m_0$ indicates initial performance measurement, $m_t$ indicates current performance measurement, and $m_{t-1}$ indicates previous performance measurement relative to the current performance measurement. The performance measurement may be, for example, a delay, a throughput, or an execution time.

307: The environment model transfers the value R to the agent model.

The agent model updates a knob tuning policy based on the representation value R, and determines an updated recommended configuration knob set based on the updated simulated status information S'.

If the representation value R meets a preset condition, the updated recommended configuration knob set is determined as the configuration knob set.

If the representation value R does not meet a preset condition, the process in which the environment model updates S and S' and the agent model determines the updated recommended configuration knob set in 305 and 306 is repeatedly performed, until the representation value R meets the preset condition. An updated recommended configuration knob set corresponding to a value R that meets the preset condition is the configuration knob set.

In this possible implementation, meeting the preset condition may include that the value R exceeds a preset threshold, or a pre-specified resource limitation condition is reached. For example, iteration is performed for a predetermined quantity of times, or iteration is performed for preset duration.

In other words, step 204 may include: determining, based on the N target feature vectors and the current status information of the database by using a double-state deep reinforcement learning (DS-DRL) model, the configuration knob set that is of the database and that corresponds to the N query statements.

When the DS-DRL model includes the prediction model, the environment model, and the agent model, the determining, based on the N target feature vectors and the current status information of the database by using a double-state deep reinforcement learning (DS-DRL) model, the configuration knob set that is of the database and that corresponds to the N query statements may include:

predicting a status information change amount ΔS of the database based on the N target feature vectors by using the prediction model, where ΔS is an amount of a change from status information that is of the database and that exists before the N query statements are executed to status information that is of the database and that is obtained after the N query statements are executed;

determining, by using the environment model and based on ΔS and the status information S that is of the database and that exists before the N query statements are executed, simulated status information S' that is of the database and that is obtained after the N query statements are executed in a simulated manner;

determining a recommended configuration knob set based on the simulated status information S' by using the agent model;

performing simulated configuration based on the recommended configuration knob set by using the environment model, executing the N target feature vectors, to update S and S', and determining a representation value R obtained after the N target feature vectors are executed;

updating a knob tuning policy based on the representation value R by using the agent model, and determining an updated recommended configuration knob set based on the updated simulated status information S'; and if the representation value R meets a preset condition, determining that the updated recommended configuration knob set is the configuration knob set; or if the representation value R does not meet a preset condition, repeatedly performing the foregoing process in which the environment model updates S and S' and the agent model determines the updated recommended configuration knob set, until the representation value R meets the preset condition, where an updated recommended configuration knob set corresponding to a value R that meets the preset condition is the configuration knob set.

Figure 15:
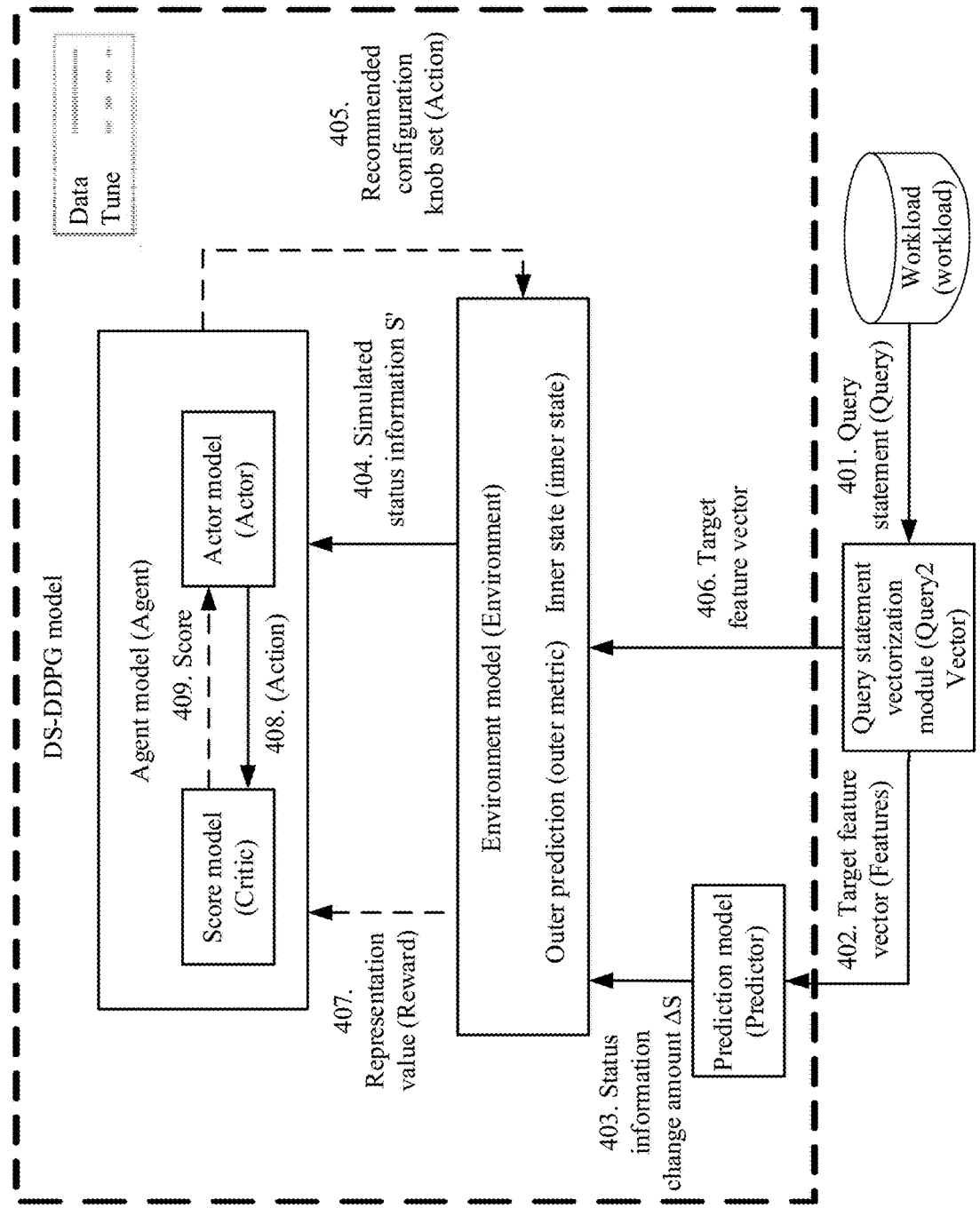
FIG. 15 is a schematic diagram of an architecture of DS-DDPG according to an embodiment of this application.

The foregoing describes the process of tuning a knob based on a DS-DRL model. The following describes a process of tuning a knob based on a DS-DDPG model with reference to FIG. 15.

When the DS-DRL model is a DS-DDPG model, the agent model includes an actor (actor) model and a score critic model. The actor model and the score (critic) model may be neural network models.

Steps 401 to 403 in the process of tuning a knob based on a DS-DDPG model are the same as steps 301 to 303 in the foregoing embodiment. Details are not described herein again.

404: The environment model transfers S' to the actor model.

The actor model uses S' as an input, to generate a recommended configuration knob set (action). To be specific, the determining a recommended configuration knob set based on the simulated status information S' by using the agent model may include: determining the recommended configuration knob set based on the simulated status information S' by using the actor model; and determining a score of the recommended configuration knob set based on the simulated status information S' and the recommended configuration knob set by using the critic model.

Steps 405 and 406 are the same as steps 305 and 306 in the foregoing embodiment. Details are not described herein again.

407: The environment model transfers the value R to the critic model.

408: The actor model transfers the configuration knob set to the critic model.

The critic model determines a score of the recommended configuration knob set based on the simulated status information S' and the recommended configuration knob set.

409: The critic model transfers the score to the actor model.

The updating a knob tuning policy based on the representation value R in 307 may include the following step:

The actor model updates a weight of the actor model based on the score. In other words, the weight of the actor model is updated based on the score by using the actor model.

The critic model updates the weight of the critic model based on the representation value R. In other words, the weight of the critic model is updated based on the representation value R by using the critic model.

In comparison with a default configuration or a configuration recommended by a DBA, there is a shorter delay in the solution for tuning a configuration knob of a database provided in this embodiment of this application. Table 1 shows delay test results of testing a use case of TPCH 10× and a use case of TPCH 30× in a case of different configurations by using a use case of transaction processing performance council Benchmark™H (transaction processing performance council Benchmark™H, TPC-H) as an example.

TABLE 1

| Total job execution delay (seconds: s) in case of different configurations | | | |
|---|---|---|---|
|  | Default Configuration | Configuration recommended by a DBA | Configuration recommended for optimization |
| TPCH 10× | 293.37 | 283.12 | 197.90 |
| TPCH 30× | 1083.67 | 872.45 | 539.86 |

It can be learned from Table 1 that, in both the use case of TPCH 10× and the use case of TPCH 30×, the delay in the solution of the configuration recommended for optimization provided in this embodiment of this application is far less than those of the default configuration and the configuration recommended by the DBA.

The database system and the method for determining a configuration knob of a database are described in the foregoing plurality of embodiments. The following describes, with reference to accompanying drawings, an apparatus 50 for determining a configuration knob of a database provided in an embodiment of this application.

Figure 16:
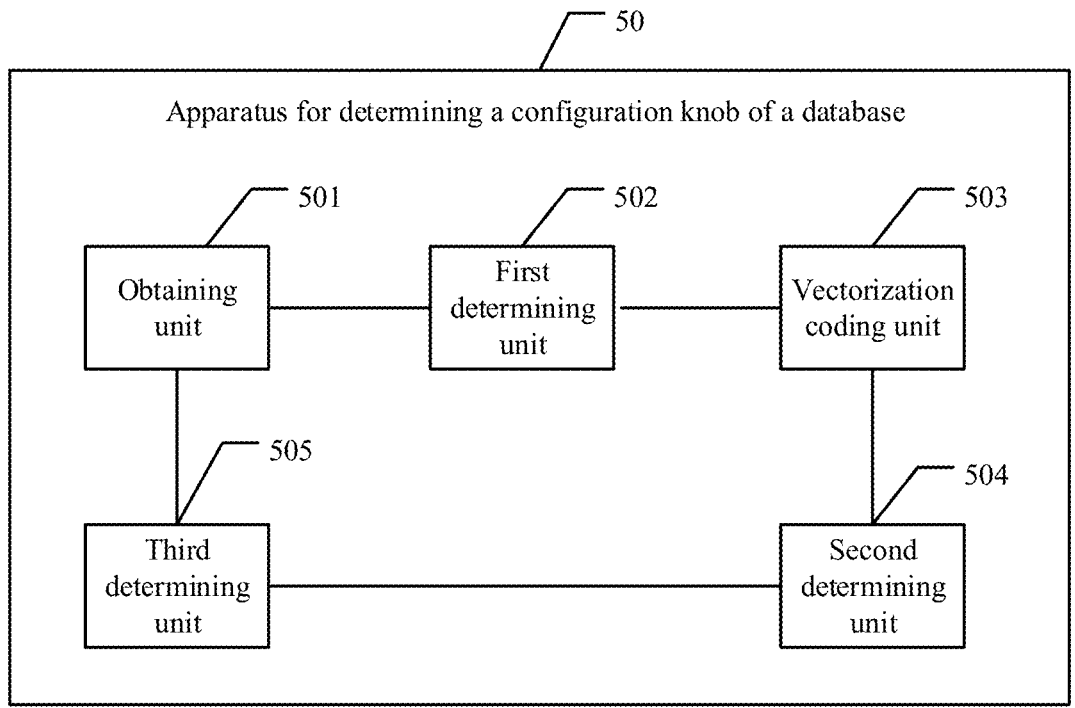
FIG. 16 is a schematic diagram of an embodiment of an apparatus for determining a configuration knob of a database according to an embodiment of this application.

As shown in FIG. 16, an embodiment of an apparatus 50 for determining a configuration knob of a database provided in an embodiment of this application includes:

an obtaining unit 501, configured to obtain N query statements sent by M clients, where M is an integer greater than 0, N is an integer greater than 0, and N≥M;

a first determining unit 502, configured to determine N pieces of query information from the N query statements obtained by the obtaining unit 501, where the N query statements are in a one-to-one correspondence with the N pieces of query information;

a vectorization coding unit 503, configured to perform vectorization coding on the N pieces of query information determined by the first determining unit 502, to obtain corresponding N target feature vectors, where the N pieces of query information are in a one-to-one correspondence with the N target feature vectors; and a second determining unit 504, configured to determine, based on the N target feature vectors obtained by the vectorization coding unit 503 and current status information of the database, a configuration knob set that is of the database and that corresponds to the N query statements, where the configuration knob set includes at least one target configuration knob group, the target configuration knob group includes at least one configuration knob, and the configuration knob set is used to execute the N query statements.

In this embodiment of this application, the configuration knob of the database may be determined based on the target feature vector of the query statement and the current status information of the database, to ensure good performance of the database in a case of different workload requirements. For example, performance in aspects of a delay and a throughput can be met.

In a possible implementation, the apparatus further includes:

a third determining unit 505, configured to determine, in response to a mode selection instruction from a query-level knob tuning mode, a workload-level knob tuning mode, and a cluster-level knob tuning mode, a target knob tuning mode used for the N query statements obtained by the obtaining unit 501.

In a possible implementation, the vectorization coding unit 503 is further configured to: when the target knob tuning mode is the workload-level knob tuning mode, fuse the N target feature vectors, to obtain a unified vector obtained through fusion; and the second determining unit 504 is configured to determine, based on the unified vector and the current status information of the database, the configuration knob set that is of the database and that corresponds to the N query statements, where the configuration knob set includes one target configuration knob group, and the one target configuration knob group is used to tune, when the N query statements are executed, a configuration knob currently used for the database.

In a possible implementation, the second determining unit 504 is configured to: when the target knob tuning mode is the cluster-level knob tuning mode, determine N configuration knob groups based on the N target feature vectors and the current status information of the database, where the N configuration knob groups are in a one-to-one correspondence with the N target feature vectors; and perform clustering on the N configuration knob groups, to obtain Q target configuration knob groups, where a first configuration knob group corresponds to at least one target feature vector, the first configuration knob group is any one of the Q target configuration knob groups, Q is an integer greater than 0, Q<N, and the first configuration knob group is used to tune, when a query statement corresponding to the at least one target feature vector is executed, a configuration knob currently used for the database.

In a possible implementation, first query information in the N pieces of query information includes a first query type, first table information, and a type and corresponding cost information of an involved operator in a query, and the first query information is any one of the N pieces of query information;
- the first query type is used to indicate a type of an operation that is requested by a query statement corresponding to the first query information and that is to be performed on the database;
- the first table information is used to indicate a relationship table involved when the query statement corresponding to the first query information is executed in the database; and
- the cost information is used to indicate a respective execution cost that is of the involved operator and that is incurred when the involved operator executes the query statement corresponding to the first query information.

In a possible implementation, a target feature vector corresponding to the first query information includes an identifier of the first query type, an identifier of a second query type, an identifier of the first table information, an identifier of second table information, and a floating-point bit of each type of operator;
- the identifier of the first query type is represented by using a first value, the identifier of the second query type is represented by using a second value, and the second query type belongs to a query type of the database and is not included in the first query information;
- the identifier of the first table information is represented by using a third value, the identifier of the second table information is represented by using a fourth value, and the second table information belongs to table information of the database and is not included in the first query information; and
- the floating-point bit of each type of operator includes an execution cost of the corresponding type of operator.

In a possible implementation, the execution cost of the corresponding type of operator is a normalized execution cost.

In a possible implementation, the second determining unit 504 is configured to determine, based on the N target feature vectors and the current status information of the database by using a double-state deep reinforcement learning (DS-DRL) model, the configuration knob set that is of the database and that corresponds to the N query statements.

In a possible implementation, when the DS-DRL model includes a prediction model, an environment model, and an agent model, the second determining unit 504 is configured to:
- predict a status information change amount ΔS of the database based on the N target feature vectors by using the prediction model, where ΔS is an amount of a change from status information that is of the database and that exists before the N query statements are executed to status information that is of the database and that is obtained after the N query statements are executed;
- determine, by using the environment model and based on ΔS and the status information S that is of the database and that exists before the N query statements are executed, simulated status information S' that is of the database and that is obtained after the N query statements are executed in a simulated manner;
- determine a recommended configuration knob set based on the simulated status information S' by using the agent model;
- perform simulated configuration based on the recommended configuration knob set by using the environment model, execute the N target feature vectors, to update S and S', and determine a representation value R obtained after the N target feature vectors are executed;
- update a knob tuning policy based on the representation value R by using the agent model, and determine an updated recommended configuration knob set based on the updated simulated status information S'; and
- if the representation value R meets a preset condition, determine that the updated recommended configuration knob set is the configuration knob set; or
- if the representation value R does not meet a preset condition, repeatedly perform the foregoing process in which the environment model updates S and S' and the agent model determines the updated recommended configuration knob set, until the representation value R meets the preset condition, where an updated recommended configuration knob set corresponding to a value R that meets the preset condition is the configuration knob set.

In a possible implementation, when the DS-DRL model is a double-state deep deterministic policy gradient (DS-DDPG) model, and the agent model includes an actor (actor) model and a score (critic) model, the second determining unit 504 is configured to:
- determine the recommended configuration knob set based on the simulated status information S' by using the actor model; and
- determine a score of the recommended configuration knob set based on the simulated status information S' and the recommended configuration knob set by using the critic model.

In a possible implementation, the second determining unit 504 is configured to update a weight of the actor model based on the score by using the actor model.

In a possible implementation, the second determining unit 504 is configured to update a weight of the critic model based on the representation value R by using the critic model.

Corresponding content of the apparatus 50 for determining a configuration knob of a database may be understood with reference to corresponding content of the embodiments corresponding to FIG. 8 to FIG. 15. Details are not described herein again.

In a hardware implementation, the apparatus for determining a configuration knob of a database may be a database server. The obtaining unit 501, the first determining unit 502, the vectorization coding unit 503, the second determining unit 504, and the knob tuning unit each may be a processor. Certainly, the obtaining unit 501 may also be a communications interface.

Figure 17:
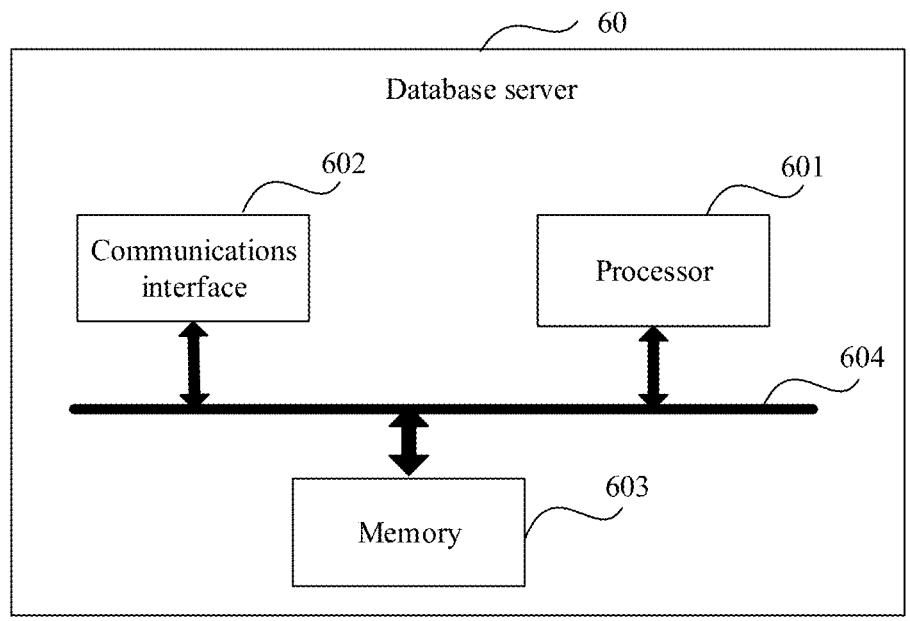
FIG. 17 is a schematic diagram of still another structure of a database server according to an embodiment of this application.

FIG. 17 is a schematic diagram of a possible logical structure of a database server 60 involved in the foregoing embodiments according to an embodiment of this application. The database server 60 includes a processor 601, a communications interface 602, a memory 603, and a bus 604. The processor 601, the communications interface 602, and the memory 603 are connected to each other by using the bus 604. In this embodiment of this application, the processor 601 is configured to control and manage an action of the database server 60. For example, the processor 601 is configured to perform steps 201 to 205 in FIG. 9 and/or another process of a technology described in this specification. The communications interface 602 is configured to support the database server 60 to perform communication. The memory 603 is configured to store program code and data of the database server 60.

The processor 601 may be a central processing unit, a general-purpose processor, a digital signal processor, an application-specific integrated circuit, a field programmable gate array or another programmable logic device, a transistor logic device, a hardware component, or any combination thereof. The processor 601 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 604 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 17, but this does not mean that there is only one bus or only one type of bus.

In another embodiment of this application, a computer-readable storage medium is further provided. The computer-readable storage medium stores computer-executable instructions. When at least one processor of a device executes the computer-executable instructions, the device performs the method for determining a configuration knob of a database described in some embodiments in FIG. 8 to FIG. 15.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device performs the method for determining a configuration knob of a database described in the embodiments in FIG. 8 to FIG. 15.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division, and there may be another division manner in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes various media that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of the embodiments of this application shall be subject to the protection scope of the claims.

What is claimed is:

1. A method for determining a configuration knob of a database, applied to a database management system (DBMS), and during operation of the database, the method comprising:

obtaining, by the at least one processor, N query statements sent by M clients, wherein M is an integer greater than 0, N is an integer greater than 0, and N≥M;

determining, by the at least one processor, N pieces of query information from the N query statements, wherein the N query statements are in a one-to-one correspondence with the N pieces of query information;

performing, by the at least one processor, vectorization coding on the N pieces of query information, to obtain corresponding N target feature vectors, wherein the N pieces of query information are in a one-to-one correspondence with the N target feature vectors; and determining, by the at least one processor based on the N target feature vectors and current status information of the database, a configuration knob set for the database and that corresponds to the N query statements, wherein the configuration knob set comprises at least one target configuration knob group, the target configuration knob group comprises at least one configuration knob, and the current status information of the database is description information of a hardware running status of the database before the N query statements are executed, and a configuration parameter set is obtained by predicting a status information change amount of the database by executing the N target feature vectors under the current status information of the database; and adjusting, according to the configuration parameter set, a configuration parameter currently used by the database, and executing the N query statements by using the configuration parameter.

2. The method according to claim 1, wherein the method further comprises:

determining, by the at least one processor in response to a mode selection instruction from a query-level knob tuning mode, a workload-level knob tuning mode, and a cluster-level knob tuning mode, a target knob tuning mode used for the N query statements.

3. The method according to claim 2, wherein when the target knob tuning mode is the workload-level knob tuning mode, the method further comprises:

fusing, by the at least one processor, the N target feature vectors, to obtain a unified vector; and wherein the determining, by the at least one processor based on the N target feature vectors and the current status information of the database, the configuration knob set for the database and that corresponds to the N query statements comprises:

determining, by the at least one processor based on the unified vector and the current status information of the database, the configuration knob set for the database and that corresponds to the N query statements, wherein the configuration knob set comprises one target configuration knob group, and the one target configuration knob group is used to tune, when the N query statements are executed, a configuration knob currently used for the database.

4. The method according to claim 2, wherein when the target knob tuning mode is the cluster-level knob tuning mode, the determining, by the at least one processor based on the N target feature vectors and the current status information of the database, the configuration knob set for the database and that corresponds to the N query statements comprises:

determining, by the at least one processor, N configuration knob groups based on the N target feature vectors and the current status information of the database, wherein the N configuration knob groups are in a one-to-one correspondence with the N target feature vectors; and performing, by the at least one processor, clustering on the N configuration knob groups, to obtain Q target configuration knob groups, wherein a first configuration knob group corresponds to at least one target feature vector, the first configuration knob group is any one of the Q target configuration knob groups, Q is an integer greater than 0, Q<N, and the first configuration knob group is used to tune, when a query statement corresponding to the at least one target feature vector is executed, a configuration knob currently used for the database.

5. The method according to claim 1, wherein first query information in the N pieces of query information comprises a first query type, first table information, and a type and corresponding cost information of an involved operator in a query, and the first query information is any one of the N pieces of query information;

the first query type is used to indicate a type of an operation that is requested by a query statement corresponding to the first query information and that is to be performed on the database;

the first table information is used to indicate a relationship table involved when the query statement corresponding to the first query information is executed in the database; and the cost information is used to indicate a respective execution cost for the involved operator and that is incurred when the involved operator executes the query statement corresponding to the first query information.

6. The method according to claim 5, wherein a target feature vector corresponding to the first query information comprises an identifier of the first query type, an identifier of a second query type, an identifier of the first table information, an identifier of second table information, and a floating-point bit of each type of operator;

the identifier of the first query type is represented by using a first value, the identifier of the second query type is represented by using a second value, and the second query type belongs to a query type of the database and is not comprised in the first query information;

the identifier of the first table information is represented by using a third value, the identifier of the second table information is represented by using a fourth value, and the second table information belongs to table information of the database and is not comprised in the first query information; and the floating-point bit of each type of operator comprises an execution cost of the corresponding type of operator.

7. The method according to claim 6, wherein the execution cost of the corresponding type of operator is a normalized execution cost.

8. The method according to claim 1, wherein the determining, by the at least one processor based on the N target feature vectors and the current status information of the database, the configuration knob set for the database and that corresponds to the N query statements comprises:

determining, by the at least one processor based on the N target feature vectors and the current status information of the database by using a double-state deep reinforcement learning (DS-DRL) model, the configuration knob set for the database and that corresponds to the N query statements.

9. The method according to claim 8, wherein the DS-DRL model comprises a prediction model, an environment model, and an agent model;

the determining, by the at least one processor based on the N target feature vectors and the current status information of the database by using the double-state deep reinforcement learning (DS-DRL) model, the configuration knob set for the database and that corresponds to the N query statements comprises:

predicting, by the at least one processor, a status information change amount $\Delta S$ of the database based on the N target feature vectors by using the prediction model, wherein ΔS is an amount of a change from status information for the database and that exists before the N query statements are executed to status information for the database and that is obtained after the N query statements are executed;

determining, by the at least one processor by using the environment model and based on ΔS and the status information S for the database and that exists before the N query statements are executed, simulated status information S' for the database and that is obtained after the N query statements are executed in a simulated manner;

determining, by the at least one processor, a recommended configuration knob set based on the simulated status information S' by using the agent model;

performing, by the at least one processor, a simulated configuration based on the recommended configuration knob set by using the environment model, executing the N target feature vectors, to update S and S', and determining, by the at least one processor, a representation value R obtained after the N target feature vectors are executed;

updating, by the at least one processor, a knob tuning policy based on the representation value R by using the agent model, and determining, by the at least one processor, an updated recommended configuration knob set based on the updated simulated status information S'; and when the representation value R meets a preset condition, determining, by the at least one processor, that the updated recommended configuration knob set is the configuration knob set; or when the representation value R does not meet a preset condition, repeatedly performing, by the at least one processor, the foregoing process in which the environment model updates S and S' and the agent model determines the updated recommended configuration knob set, until the representation value R meets the preset condition, wherein an updated recommended configuration knob set corresponding to a value R that meets the preset condition is the configuration knob set.

10. The method according to claim 9, wherein when the DS-DRL model is a double-state deep deterministic policy gradient (DS-DDPG) model, the agent model comprises an actor (actor) model and a score (critic) model; and the determining, by the at least one processor, the recommended configuration knob set based on the simulated status information S' by using the agent model comprises:

determining, by the at least one processor, the recommended configuration knob set based on the simulated status information S' by using the actor model; and determining, by the at least one processor, a score of the recommended configuration knob set based on the simulated status information S' and the recommended configuration knob set by using the critic model.

11. The method according to claim 10, wherein the updating, by the at least one processor, the knob tuning policy based on the representation value R comprises:

updating, by the at least one processor, a weight of the actor model based on the score by using the actor model.

12. The method according to claim 10, wherein the updating, by the at least one processor, the knob tuning policy based on the representation value R comprises:

updating, by the at least one processor, a weight of the critic model based on the representation value R by using the critic model.

13. An apparatus of a database management system (DBMS) for determining a configuration knob of a database, comprising:

a processor; and a non-transitory memory storing instructions that when executed by the processor and during operation of the database, cause the apparatus to perform operations comprising:

obtaining N query statements sent by M clients, wherein M is an integer greater than 0, N is an integer greater than 0, and N≥M;

determining N pieces of query information from the N query statements, wherein the N query statements are in a one-to-one correspondence with the N pieces of query information;

performing vectorization coding on the N pieces of query information, to obtain corresponding N target feature vectors, wherein the N pieces of query information are in a one-to-one correspondence with the N target feature vectors; and determining, based on the N target feature vectors and current status information of the database, a configuration knob set for the database and that corresponds to the N query statements, wherein the configuration knob set comprises at least one target configuration knob group, the target configuration knob group comprises at least one configuration knob, and the current status information of the database is description information of a hardware running status of the database before the N query statements are executed, and a configuration parameter set is obtained by predicting a status information change amount of the databased by executing the N target feature vectors under the current status information of the database; and adjusting, according to the configuration parameter set, a configuration parameter currently used by the database, and executing the N query statements by using the configuration parameter.

14. The apparatus according to claim 13, wherein the apparatus is further caused to perform steps comprising:

determining, in response to a mode selection instruction from a query-level knob tuning mode, a workload-level knob tuning mode, and a cluster-level knob tuning mode, a target knob tuning mode used for the N query statements.

15. The apparatus according to claim 14, wherein the performing the vectorization coding on the N pieces of query information further comprises: when the target knob tuning mode is the workload-level knob tuning mode, fusing the N target feature vectors, to obtain a unified vector; and the determining the configuration knob set further comprises: determining based on the unified vector and the current status information of the database, the configuration knob set for the database and that corresponds to the N query statements, wherein the configuration knob set comprises one target configuration knob group, and the one target configuration knob group is used to tune, when the N query statements are executed, a configuration knob currently used for the database.

16. The apparatus according to claim 14, wherein the determining the configuration knob set further comprises: when the target knob tuning mode is the cluster-level knob tuning mode, determining N configuration knob groups based on the N target feature vectors and the current status information of the database, wherein the N configuration knob groups are in a one-to-one correspondence with the N target feature vectors; and performing clustering on the N configuration knob groups, to obtain Q target configuration knob groups, wherein a first configuration knob group corresponds to at least one target feature vector, the first configuration knob group is any one of the Q target configuration knob groups, Q is an integer greater than 0, Q<N, and the first configuration knob group is used to tune, when a query statement corresponding to the at least one target feature vector is executed, a configuration knob currently used for the database.

17. The apparatus according to claim 13, wherein first query information in the N pieces of query information comprises a first query type, first table information, and a type and corresponding cost information of an involved operator in a query, and the first query information is any one of the N pieces of query information;
the first query type is used to indicate a type of an operation that is requested by a query statement corresponding to the first query information and that is to be performed on the database;
the first table information is used to indicate a relationship table involved when the query statement corresponding to the first query information is executed in the database; and
the cost information is used to indicate a respective execution cost for the involved operator and that is incurred when the involved operator executes the query statement corresponding to the first query information.

18. The apparatus according to claim 17, wherein
a target feature vector corresponding to the first query information comprises an identifier of the first query type, an identifier of a second query type, an identifier of the first table information, an identifier of second table information, and a floating-point bit of each type of operator;
the identifier of the first query type is represented by using a first value, the identifier of the second query type is represented by using a second value, and the second query type belongs to a query type of the database and is not comprised in the first query information;
the identifier of the first table information is represented by using a third value, the identifier of the second table information is represented by using a fourth value, and the second table information belongs to table information of the database and is not comprised in the first query information; and
the floating-point bit of each type of operator comprises an execution cost of the corresponding type of operator.

19. The apparatus according to claim 18, wherein the execution cost of the corresponding type of operator is a normalized execution cost.

20. The apparatus according to claim 13, wherein:
the determining the configuration knob set further comprises: determining based on the N target feature vectors and the current status information of the database by using a double-state deep reinforcement learning (DS-DRL) model, the configuration knob set for the database and that corresponds to the N query statements.

* * * * *